United States Patent [19]

Agnew et al.

[11] Patent Number: 4,498,147
[45] Date of Patent: Feb. 5, 1985

[54] METHODOLOGY FOR TRANSFORMING A FIRST EDITABLE DOCUMENT FORM PREPARED WITH A BATCH TEXT PROCESSING SYSTEM TO A SECOND EDITABLE DOCUMENT FORM USABLE BY AN INTERACTIVE OR BATCH TEXT PROCESSING SYSTEM

[75] Inventors: Palmer W. Agnew, Owego; Anne S. Kellerman, Endicott; Grayson W. Randall, Vestal, all of N.Y.

[73] Assignee: International Business Machines Corporation, Armonk, N.Y.

[21] Appl. No.: 442,927

[22] Filed: Nov. 18, 1982

[51] Int. Cl.³ .............................................. G06F 1/00
[52] U.S. Cl. .................................................... 364/900
[58] Field of Search ........................ 364/900 MS File

[56] References Cited

U.S. PATENT DOCUMENTS 4,357,680 11/1982 Greek, Jr. et al. ................... 364/900
4,425,629 1/1984 Cason et al. ......................... 364/900

Primary Examiner—Raulfe B. Zache
Attorney, Agent, or Firm—Saul A. Seinberg

[57] ABSTRACT

A method of transforming a first editable form of a document prepared by a batch text processing system into a second and incompatible editable form for use in another batch or an interactive text processing system through the use of a transform mechanism is described. A significant step of this method requires the identification of a limited number of key state variables, whose values reflect information concerning source document controls that have been read in a sequence thereof. The next step requires a definition of control compatibility, which source document controls are compatible with other source controls that set the state variables to their current values in that sequence. After control compatibility has been determined, it will be necessary to define the output items that need to be written for the target document as part of the transformation of any possible input sequence. In the next step, with respect to the output items thus defined, an ordering or hierarchy of these items is established so that they will be uniformly handled in the transformation. Then, for each possible output item, determine a set of rules which will govern when and if that output item gets written to the target document based on the value of the key variables in response to a particular set of input items that have been read from the source document. The output item is written if any one or more of the rules is satisfied. Text, when encountered, is defined as always ending a sequence and thereby initiating a write, if appropriate, to the target document of the transformation of the preceding sequence of controls.

7 Claims, 34 Drawing Figures

| STATE VARIABLE | INIT VAL | MEANING OF THIS INITIAL VALUE |
|---|---|---|
| GOTEOR | 0 | No End of Record is waiting to be processed |
| GOTBR | 0 | No BREAK is waiting to be processed |
| GOTIN | 0 | No new identation is waiting to happen |
| CNTINC | 0 | Zero displacement of temporary left margin to the right of permanent left margin |
| GOTPA | 0 | No new page is waiting to begin |
| GOTPAN | 0 | No page is waiting to end (NOSTART) |
| GOTSK | 0 | No new conditional skipping of blank lines |
| CNTBL | 0 | Zero count of new blank lines to skip |
| GOTSP | 0 | No new required spacing of blank lines |
| CNTRBL | 0 | Zero count of new required blank lines |
| GOTUSON | 0 | No underscore on is waiting to happen |
| GOTUSOF | 0 | No underscore off is waiting to happen |
| GOTHW | 0 | Following word does not want SHY for HYP |
| GOTCE | 0 | Following text is not to be centered |
| GOTFOJU | 0 | No format or justify changes waiting |
| VALADJ | 1 | Do adjust line endings       ) i.e.: |
| VALAL | 4 | Do justify (straight right)  )    .FO ON |
| GOTTB | 0 | No tab rack change is waiting |
| VALTP | X'LLE602000000005000A...', tabs at 5,10,15,... | |
| GOTSSDS | 0 | No single or double space control waiting |
| VALSSDS | 1 | Single space is in effect |
| GOTPE | 0 | No PAGE END byte has occurred |
| GOTRHON | 0 | No Running Heading is waiting to happen |
| TMT | X'05E80100' | a null "top, all" margin text vector |
| M... | * | Separate state variables for margin text |
| GOTRFON | 0 | No Running Footing is waiting to happen |
| BMT | X'05E80400' | a null "bot, all" margin test vector |
| GOTCMDR | 0 | No comment specifying source drawer waiting |
| VALCMDR | 0 | No comment has specified a source drawer |
| GOTEOF | 0 | No End Of File waiting to be processed |

FIG. 2

| DCF CONTROL | AFFECTS STATE VARIABLES |
|---|---|
| EOR | Set GOTEOR |
| .BR or any of the other 51 DCF controls that cause a BREAK, whether in the supported set or not. This includes the .IN control with the BREAK default value but not with NOBREAK. | Set GOTBR |
| .PA | If GOTPA or GOTPAN or GOTPE is set, start a new sequence with this, else Set GOTPA. |
| .PA NOSTART | If GOTPA or GOTPAN or GOTPE is set, start a new sequence with this, else Set GOTPAN. |
| .SK v | If GOTPA or GOTPAN or GOTPE or GOTSSDS is set, start a new sequence with this, else Set GOTSK. Increase CNTBL by v to count blank lines |
| .SP v | If GOTPA or GOTPAN or GOTPE or GOTSSDS is set, start a new sequence with this, else Set GOTSP Increase CNTRBL by v to count required blank lines. |

FIG. 3A

| DCF CONTROL | AFFECTS STATE VARIABLES |
|---|---|
| .PP | If GOTPA or GOTPAN or GOTPE or GOTSSDS is set, start a new sequence with this, else Set GOTSK<br>Increase CNTBL by 1 to count one blank line |
| .IN h NOBREAK or BREAK | Set GOTIN<br>Set CNTINC to h to save new temp left margin |
| .US ON | Set GOTUSON<br>Reset GOTUSOF |
| .US OFF | Set GOTUSOF<br>Reset GOTUSON |
| .HW wo-rd | Set GOTHW<br>Note that any CONTROL before end of sequence must reset GOTHW, since DCF would abend then |
| .CE text to center | Set GOTCE<br>Note that any controls can intervene; just center the next text line |
| .FO ON or OFF or LEFT | Set GOTFOJU<br>Update VALADJ and VALAL based on parameters |
| .JU ON or OFF | Set GOTFOJU<br>Update VALAL based on parameter |

FIG. 3B

| DCF CONTROL | AFFECTS STATE VARIABLES |
|---|---|
| .SS | Set GOTSSDS<br>Set VALSSDS to 1 |
| .DS | Set GOTSSDS<br>Set VALSSDS to 2 |
| .TB a b c... | Set GOTTB<br>Write parameters into VALTP<br>  Fill beyond last tab setting<br>  with a tab at each integer<br>  multiple of 5 out to 80<br>If blank, write default rack |
| PE BYTE | If GOTPE is set, start a new<br>  sequence with this, else<br>Set GOTPE |
| .RH ON | Set GOTRHON<br>Initialize separate state<br>  variables "MGOTBR" etc. **<br>Set CURTMT so L3 will be<br>  written into TMT buffer. |
| .RH OFF | Terminate above special<br>  processing, save TMT. |
| .RF ON | Set GOTRFON<br>Initialize separate state<br>  variables "MGOTBR" etc. **<br>Set CURBMT so L3 will be<br>  written into BMT buffer. |
| .RF OFF | Terminate above special<br>  processing, save BMT. |
| .CM DRAWER text | Set GOTCMDR<br>Recognize "text" string<br>Set VALCMDR to 1, 2, ... |
| Anything except .HW<br>  (even EOR resets it) | Reset GOTHW<br>  (since .HW takes effect only<br>  if it is the last thing in a<br>  sequence) |
| Any of the 28 controls<br>  that start a page after<br>  a .PA NOSTART control | If and only if GOTPAN = 1, set<br>  GOTPA |

FIG. 3C

| ABBREVIATION | MEANING OF THIS L3 ITEM |
|---|---|
| CRE | CARRIER RETURN |
| RCR | REQUIRED CARRIER RETURN |
| CREs | SEVERAL CARRIER RETURNS FOR BLANK LINES |
| RSPCREs | SEVERAL REQUIRED SPACES AND CARRIER RETURNS FOR NON-CONDITIONAL BLANK LINES |
| CRERSPs | SEVERAL CARRIER RETURNS AND REQUIRED SPACES FOR NON-CONDITIONAL BLANK LINES NOT FOLLOWING A LINE ENDER |
| EUS | END UNDERSCORE |
| RPE | REQUIRED PAGE END |
| LFC | LINE FORMAT CHANGE SEQUENCE OF MULTI-BYTE CONTROLS |
| ZICR | ZERO INDEX CARRIER RETURN |
| PE | PAGE END |
| TUP | TEXT UNIT PREFIX |
| TUFC | TEXT UNIT FORMAT CHANGE |
| MP | MARGIN TEXT PARAMETERS |
| MT | MARGIN TEXT |
| BT | BODY TEXT |
| SPACEsATF | SPACE CHARACTERS AND ALIGN TEXT FIELD FOR CENTERING TEXT |
| ITs | INDENT TAB CONTROLS TO SET INDENTATION |
| BUS | BEGIN UNDERSCORE |
| CURHW | CURRENTLY HYPHENATING WORD (used by code) |
| EU | END UNIT (SEVERAL L3 controls) |

FIG. 4

| DECISION TABLE FOR ITEM ORDERING, 1 | | | | | | | | |
|---|---|---|---|---|---|---|---|---|
| Output | 1 | 2 | 3 | 4 | 5 | 6 | 7 | 8 |
| CRE | 1 | . | . | . | . | . | . | . |
| RCR | . | . | . | . | . | . | . | . |
| CREs | . | 1 | . | . | . | . | . | . |
| RSPCREs | . | 1 | . | . | . | . | . | . |
| CRERSPs | . | 1 | . | . | . | . | . | . |
| EUS | . | . | . | . | . | . | . | . |
| RPE | . | 2 | 1 | . | . | . | . | . |
| LFC | 1 | . | . | . | . | . | . | . |
| ZICR | 2 | . | . | . | . | . | . | . |
| PE | . | 2 | 2 | 1 | . | . | . | . |
| TUP | . | . | . | 2 | 1 | . | . | 1 |
| TUFC | . | . | . | . | 2 | 1 | . | . |
| MP | . | . | . | . | . | 2 | 1 | . |
| MT | . | . | . | . | . | . | 2 | . |
| BT | . | . | . | . | . | . | . | 2 |
| SPACEsATF | . | . | . | . | . | . | . | . |
| ITs | . | . | . | . | . | . | . | . |
| BUS | . | . | . | . | . | . | . | . |
| CURHW | . | . | . | . | . | . | . | . |
| EU | . | . | . | . | . | . | . | . |

FIG. 5

| DECISION TABLE FOR ITEM ORDERING, 2 | | | | | | | | |
|---|---|---|---|---|---|---|---|---|
| Output | 9 | 10 | 11 | 12 | 13 | 14 | 15 | 16 |
| CRE      |   |   |   |   |   |   |   |   |
| RCR      |   |   |   |   | 1 |   |   |   |
| CREs     |   |   |   |   |   |   |   |   |
| RSPCREs  |   |   |   |   |   |   |   |   |
| CRERSPs  |   |   |   |   |   |   |   |   |
| EUS      | 1 | 1 |   |   |   |   |   |   |
| RPE      |   |   |   |   | 1 |   |   |   |
| LFC      |   |   |   |   | 1 |   |   |   |
| ZICR     |   |   |   |   |   |   |   |   |
| PE       |   |   |   |   |   |   | 1 |   |
| TUP      |   |   |   |   |   |   |   |   |
| TUFC     |   |   |   |   |   |   |   |   |
| MP       |   |   |   |   |   |   |   |   |
| MT       |   |   |   |   |   |   |   |   |
| BT       |   |   |   |   |   |   |   |   |
| SPACEsATF | 2 |   | 1 |   |   | 1 |   |   |
| ITs      |   | 2 |   | 1 | 2 | 2 |   |   |
| BUS      |   |   | 2 | 2 |   |   |   |   |
| CURHW    |   |   |   |   |   |   |   |   |
| EU       |   |   |   |   |   |   | 2 |   |

FIG. 6

| DECISION TABLE FOR ITEM ORDERING, 3 | | | | | | | | |
|---|---|---|---|---|---|---|---|---|
| Output | 17 | 18 | 19 | 20 | 21 | 22 | 23 | 24 |
| CRE      |   |   |   |   |   |   |   |   |
| RCR      | 1 |   |   |   |   |   |   |   |
| CREs     |   |   |   |   |   |   |   |   |
| RSPCREs  | 2 |   |   |   |   |   |   |   |
| CRERSPs  | 2 |   |   |   |   |   |   |   |
| EUS      |   |   |   |   |   |   |   |   |
| RPE      |   | 1 |   |   |   |   |   |   |
| LFC      |   | 2 |   |   |   |   |   |   |
| ZICR     |   |   |   |   |   |   |   |   |
| PE       |   |   |   |   |   |   |   |   |
| TUP      |   |   |   |   |   |   |   |   |
| TUFC     |   |   |   |   |   |   |   |   |
| MP       |   |   |   |   |   |   |   |   |
| MT       |   |   |   |   |   |   |   |   |
| BT       |   |   |   |   |   |   |   |   |
| SPACEsATF |   |   |   |   |   |   |   |   |
| ITs      |   |   |   |   |   |   |   |   |
| BUS      |   |   |   |   |   |   |   |   |
| CURHW    |   |   |   |   |   |   |   |   |
| EU       |   |   |   |   |   |   |   |   |

FIG. 7

| DECISION TABLE FOR IMPLICATIONS AMONG ITEMS | | | | | | | | |
|---|---|---|---|---|---|---|---|---|
| Output | 1 | 2 | 3 | 4 | 5 | 6 | 7 | 8 |
| CRE | . | . | . | . | . | . | . | . |
| RCR | . | . | . | . | . | . | . | . |
| CREs | . | . | . | . | . | . | . | . |
| RSPCREs | . | . | . | . | . | . | . | . |
| CRERSPs | . | . | . | . | . | . | . | . |
| EUS | . | . | . | . | . | . | . | . |
| RPE | . | . | . | . | . | . | . | . |
| LFC | . | . | . | . | . | . | . | . |
| ZICR | . | . | . | . | . | . | . | . |
| PE | -Y | -Y | . | . | . | . | . | . |
| TUP | -Y | -Y | . | . | . | . | . | . |
| TUFC | Y | -Y | . | . | . | . | . | . |
| MP | . | Y | . | . | . | . | . | . |
| MT | . | -Y | . | . | . | . | . | . |
| BT | -Y | -Y | . | . | . | . | . | . |
| SPACEsATF | . | . | . | . | . | . | . | . |
| ITs | . | . | . | . | . | . | . | . |
| BUS | . | . | . | . | . | . | . | . |
| CURHW | . | . | . | . | . | . | . | . |
| EU | . | . | . | . | . | . | . | . |

FIG. 8

| DECISION TABLE FOR OUTPUT CRE | | | | | | | | |
|---|---|---|---|---|---|---|---|---|
| End State | 1 | 2 | 3 | 4 | 5 | 6 | 7 | 8...more |
| GOTEOR | Y | . | . | . | . | . | . | . |
| GOTBR | . | Y | . | . | . | . | . | . |
| GOTPA | N | N | N | N | N | N | N | N |
| GOTPAN | N | N | N | N | N | N | N | N |
| GOTSK | . | . | . | . | . | . | . | . |
| CNTBL | . | . | . | . | . | . | . | . |
| GOTSP | . | . | . | . | . | . | . | . |
| CNTRBL | . | . | . | . | . | . | . | . |
| GOTIN | . | . | . | . | . | . | . | . |
| GOTUSON | . | . | . | . | . | . | . | . |
| GOTUSOF | . | . | . | . | . | . | . | . |
| GOTHW | . | . | . | . | . | . | . | . |
| GOTCE | . | . | . | . | . | . | . | . |
| GOTFOJU | . | . | . | Y | . | . | . | . |
| GOTTB | . | . | . | . | Y | . | . | . |
| GOTSSDS | . | . | . | . | . | Y | . | . |
| GOTPE | . | . | Y | . | . | . | . | . |
| GOTRHON | . | . | . | . | . | . | Y | . |
| GOTRFON | . | . | . | . | . | . | . | Y |
| GOTCMDR | . | . | . | . | . | . | . | . |
| CNTINC LT CURINC | N | N | N | N | N | N | N | N |
| CNTINC GT CURINC | . | . | . | . | . | . | . | . |
| CNTINC GT ZERO | . | . | . | . | . | . | . | . |
| GOTEOF | . | . | . | . | . | . | . | . |

FIG. 9A

| DECISION TABLE FOR OUTPUT CRE (continued) | | | | | | | | |
|---|---|---|---|---|---|---|---|---|
| End State | 9 | 10 | 11 | 12 | 13 | 14 | 15 | 16 |
| GOTEOR | . | . | . | . | . | . | . | . |
| GOTBR | . | . | . | . | . | . | . | . |
| GOTPA | N | N | N | . | . | . | . | . |
| GOTPAN | N | N | N | . | . | . | . | . |
| GOTSK | . | . | . | . | . | . | . | . |
| CNTBL | . | . | . | . | . | . | . | . |
| GOTSP | . | . | . | . | . | . | . | . |
| CNTRBL | . | . | . | . | . | . | . | . |
| GOTIN | . | . | . | . | . | . | . | . |
| GOTUSON | . | . | . | . | . | . | . | . |
| GOTUSOF | . | . | . | . | . | . | . | . |
| GOTHW | . | . | . | . | . | . | . | . |
| GOTCE | . | . | . | . | . | . | . | . |
| GOTFOJU | . | . | . | . | . | . | . | . |
| GOTTB | . | . | . | . | . | . | . | . |
| GOTSSDS | . | . | . | . | . | . | . | . |
| GOTPE | . | . | . | . | . | . | . | . |
| GOTRHON | . | . | . | . | . | . | . | . |
| GOTRFON | Y | . | . | . | . | . | . | . |
| GOTCMDR | . | Y | . | . | . | . | . | . |
| CNTINC LT CURINC | N | N | N | . | . | . | . | . |
| CNTINC GT CURINC | . | . | . | . | . | . | . | . |
| CNTINC GT ZERO | . | . | . | . | . | . | . | . |
| GOTEOF | . | . | Y | . | . | . | . | . |

FIG. 9B

| DECISION TABLE FOR OUTPUT RCR | | | | | | | | |
|---|---|---|---|---|---|---|---|---|
| End State | 1 | 2 | 3 | 4 | 5 | 6 | 7 | 8 |
| GOTEOR | . | . | . | . | . | . | . | . |
| GOTBR | . | . | . | . | . | . | . | . |
| GOTPA | N | . | . | . | . | . | . | . |
| GOTPAN | N | . | . | . | . | . | . | . |
| GOTSK | . | . | . | . | . | . | . | . |
| CNTBL | . | . | . | . | . | . | . | . |
| GOTSP | . | . | . | . | . | . | . | . |
| CNTRBL | . | . | . | . | . | . | . | . |
| GOTIN | . | . | . | . | . | . | . | . |
| GOTUSON | . | . | . | . | . | . | . | . |
| GOTUSOF | . | . | . | . | . | . | . | . |
| GOTHW | . | . | . | . | . | . | . | . |
| GOTCE | . | . | . | . | . | . | . | . |
| GOTFOJU | N | . | . | . | . | . | . | . |
| GOTTB | N | . | . | . | . | . | . | . |
| GOTSSDS | N | . | . | . | . | . | . | . |
| GOTPE | . | . | . | . | . | . | . | . |
| GOTRHON | N | . | . | . | . | . | . | . |
| GOTRFON | N | . | . | . | . | . | . | . |
| GOTCMDR | N | . | . | . | . | . | . | . |
| CNTINC LT CURINC | Y | . | . | . | . | . | . | . |
| CNTINC GT CURINC | . | . | . | . | . | . | . | . |
| CNTINC GT ZERO | . | . | . | . | . | . | . | . |
| GOTEOF | . | . | . | . | . | . | . | . |

FIG. 10

| DECISION TABLE FOR OUTPUT CREs | | | | | | | | |
|---|---|---|---|---|---|---|---|---|
| End State | 1 | 2 | 3 | 4 | 5 | 6 | 7 | 8 |
| GOTEOR | . | . | . | . | . | . | . | . |
| GOTBR | . | . | . | . | . | . | . | . |
| GOTPA | . | . | . | . | . | . | . | . |
| GOTPAN | . | . | . | . | . | . | . | . |
| GOTSK | . | . | . | . | . | . | . | . |
| CNTBL | Y | . | . | . | . | . | . | . |
| GOTSP | . | . | . | . | . | . | . | . |
| CNTRBL | . | . | . | . | . | . | . | . |
| GOTIN | . | . | . | . | . | . | . | . |
| GOTUSON | . | . | . | . | . | . | . | . |
| COTUSOF | . | . | . | . | . | . | . | . |
| GOTHW | . | . | . | . | . | . | . | . |
| GOTCE | . | . | . | . | . | . | . | . |
| GOTFOJU | . | . | . | . | . | . | . | . |
| GOTTB | . | . | . | . | . | . | . | . |
| GOTSSDS | . | . | . | . | . | . | . | . |
| GOTPE | . | . | . | . | . | . | . | . |
| GOTRHON | . | . | . | . | . | . | . | . |
| GOTRFON | . | . | . | . | . | . | . | . |
| GOTCMDR | . | . | . | . | . | . | . | . |
| CNTINC LT CURINC | . | . | . | . | . | . | . | . |
| CNTINC GT CURINC | . | . | . | . | . | . | . | . |
| CNTINC GT ZERO | . | . | . | . | . | . | . | . |
| GOTEOF | . | . | . | . | . | . | . | . |

FIG. 11

| DECISION TABLE FOR OUTPUT (RSP CRE) S | | | | | | | | |
|---|---|---|---|---|---|---|---|---|
| End State | 1 | 2 | 3 | 4 | 5 | 6 | 7 | 8 |
| GOTEOR | . | . | . | . | . | . | . | . |
| GOTBR | . | . | . | . | . | . | . | . |
| GOTPA | N | . | . | . | . | . | . | . |
| GOTPAN | N | . | . | . | . | . | . | . |
| GOTSK | . | . | . | . | . | . | . | . |
| CNTBL | . | . | . | . | . | . | . | . |
| GOTSP | . | . | . | . | . | . | . | . |
| CNTRBL | Y | . | . | . | . | . | . | . |
| GOTIN | . | . | . | . | . | . | . | . |
| GOTUSON | . | . | . | . | . | . | . | . |
| GOTUSOF | . | . | . | . | . | . | . | . |
| GOTHW | . | . | . | . | . | . | . | . |
| GOTCE | . | . | . | . | . | . | . | . |
| GOTFOJU | . | . | . | . | . | . | . | . |
| GOTTB | . | . | . | . | . | . | . | . |
| GOTSSDS | . | . | . | . | . | . | . | . |
| GOTPE | . | . | . | . | . | . | . | . |
| GOTRHON | . | . | . | . | . | . | . | . |
| GOTRFON | . | . | . | . | . | . | . | . |
| GOTCMDR | . | . | . | . | . | . | . | . |
| CNTINC LT CURINC | . | . | . | . | . | . | . | . |
| CNTINC GT CURINC | . | . | . | . | . | . | . | . |
| CNTINC GT ZERO | . | . | . | . | . | . | . | . |
| GOTEOF | . | . | . | . | . | . | . | . |

FIG. 12

| DECISION TABLE FOR OUTPUT (CRE RSP) S | | | | | | | | |
|---|---|---|---|---|---|---|---|---|
| End State | 1 | 2 | 3 | 4 | 5 | 6 | 7 | 8 |
| GOTEOR | . | . | . | . | . | . | . | . |
| GOTBR | . | . | . | . | . | . | . | . |
| GOTPA | Y | . | . | . | . | . | . | . |
| GOTPAN | . | Y | . | . | . | . | . | . |
| GOTSK | . | . | . | . | . | . | . | . |
| CNTBL | . | . | . | . | . | . | . | . |
| GOTSP | . | . | . | . | . | . | . | . |
| CNTRBL | Y | Y | . | . | . | . | . | . |
| GOTIN | . | . | . | . | . | . | . | . |
| GOTUSON | . | . | . | . | . | . | . | . |
| GOTUSOF | . | . | . | . | . | . | . | . |
| GOTHW | . | . | . | . | . | . | . | . |
| GOTCE | . | . | . | . | . | . | . | . |
| GOTFOJU | . | . | . | . | . | . | . | . |
| GOTTB | . | . | . | . | . | . | . | . |
| GOTSSDS | . | . | . | . | . | . | . | . |
| GOTPE | . | . | . | . | . | . | . | . |
| GOTRHON | . | . | . | . | . | . | . | . |
| GOTRFON | . | . | . | . | . | . | . | . |
| GOTCMDR | . | . | . | . | . | . | . | . |
| CNTINC LT CURINC | . | . | . | . | . | . | . | . |
| CNTINC GT CURINC | . | . | . | . | . | . | . | . |
| CNTINC GT ZERO | . | . | . | . | . | . | . | . |
| GOTEOF | . | . | . | . | . | . | . | . |

FIG. 13

| DECISION TABLE FOR OUTPUT EUS | | | | | | | | |
|---|---|---|---|---|---|---|---|---|
| End State | 1 | 2 | 3 | 4 | 5 | 6 | 7 | 8 |
| GOTEOR | . | . | . | . | . | . | . | . |
| GOTBR | . | . | . | . | . | . | . | . |
| GOTPA | . | . | . | . | . | . | . | . |
| GOTPAN | . | . | . | . | . | . | . | . |
| GOTSK | . | . | . | . | . | . | . | . |
| CNTBL | . | . | . | . | . | . | . | . |
| GOTSP | . | . | . | . | . | . | . | . |
| CNTRBL | . | . | . | . | . | . | . | . |
| GOTIN | . | . | . | . | . | . | . | . |
| GOTUSON | . | . | . | . | . | . | . | . |
| GOTUSOF | Y | . | . | . | . | . | . | . |
| GOTHW | . | . | . | . | . | . | . | . |
| GOTCE | . | . | . | . | . | . | . | . |
| GOTFOJU | . | . | . | . | . | . | . | . |
| GOTTB | . | . | . | . | . | . | . | . |
| GOTSSDS | . | . | . | . | . | . | . | . |
| GOTPE | . | . | . | . | . | . | . | . |
| GOTRHON | . | . | . | . | . | . | . | . |
| GOTRFON | . | . | . | . | . | . | . | . |
| GOTCMDR | . | . | . | . | . | . | . | . |
| CNTINC LT CURINC | . | . | . | . | . | . | . | . |
| CNTINC GT CURINC | . | . | . | . | . | . | . | . |
| CNTINC GT ZERO | . | . | . | . | . | . | . | . |
| GOTEOF | . | . | . | . | . | . | . | . |

FIG. 14

| DECISION TABLE FOR OUTPUT RPE | | | | | | | | |
|---|---|---|---|---|---|---|---|---|
| End State | 1 | 2 | 3 | 4 | 5 | 6 | 7 | 8 |
| GOTEOR | . | . | . | . | . | . | . | . |
| GOTBR | . | . | . | . | . | . | . | . |
| GOTPA | Y | . | . | . | . | . | . | . |
| GOTPAN | . | Y | . | . | . | . | . | . |
| GOTSK | . | . | . | . | . | . | . | . |
| CNTBL | . | . | . | . | . | . | . | . |
| GOTSP | . | . | . | . | . | . | . | . |
| CNTRBL | . | . | . | . | . | . | . | . |
| GOTIN | . | . | . | . | . | . | . | . |
| GOTUSON | . | . | . | . | . | . | . | . |
| GOTUSOF | . | . | . | . | . | . | . | . |
| GOTHW | . | . | . | . | . | . | . | . |
| GOTCE | . | . | . | . | . | . | . | . |
| GOTFOJU | . | . | . | . | . | . | . | . |
| GOTTB | . | . | . | . | . | . | . | . |
| GOTSSDS | . | . | . | . | . | . | . | . |
| GOTPE | . | . | . | . | . | . | . | . |
| GOTRHON | . | . | . | . | . | . | . | . |
| GOTRFON | . | . | . | . | . | . | . | . |
| GOTCMDR | . | . | . | . | . | . | . | . |
| CNTINC LT CURINC | . | . | . | . | . | . | . | . |
| CNTINC GT CURINC | . | . | . | . | . | . | . | . |
| CNTINC GT ZERO | . | . | . | . | . | . | . | . |
| GOTEOF | . | . | . | . | . | . | . | . |

FIG. 15

| DECISION TABLE FOR OUTPUT LFC | | | | | | | | |
|---|---|---|---|---|---|---|---|---|
| End State | 1 | 2 | 3 | 4 | 5 | 6 | 7 | 8 |
| GOTEOR | . | . | . | . | . | . | . | . |
| GOTBR | . | . | . | . | . | . | . | . |
| GOTPA | . | . | . | . | . | . | . | . |
| GOTPAN | . | . | . | . | . | . | . | . |
| GOTSK | . | . | . | . | . | . | . | . |
| CNTBL | . | . | . | . | . | . | . | . |
| GOTSP | . | . | . | . | . | . | . | . |
| CNTRBL | . | . | . | . | . | . | . | . |
| GOTIN | . | . | . | . | . | . | . | . |
| GOTUSON | . | . | . | . | . | . | . | . |
| GOTUSOF | . | . | . | . | . | . | . | . |
| GOTHW | . | . | . | . | . | . | . | . |
| GOTCE | . | . | . | . | . | . | . | . |
| GOTFOJU | Y | . | . | . | . | . | . | . |
| GOTTB | . | Y | . | . | . | . | . | . |
| GOTSSDS | . | . | Y | . | . | . | . | . |
| GOTPE | . | . | . | . | . | . | . | . |
| GOTRHON | N | N | N | . | . | . | . | . |
| GOTRFON | N | N | N | . | . | . | . | . |
| GOTCMDR | N | N | N | . | . | . | . | . |
| CNTINC LT CURINC | . | . | . | . | . | . | . | . |
| CNTINC GT CURINC | . | . | . | . | . | . | . | . |
| CNTINC GT ZERO | . | . | . | . | . | . | . | . |
| GOTEOF | . | . | . | . | . | . | . | . |

FIG. 16

| DECISION TABLE FOR OUTPUT ZICR |||||||||
|---|---|---|---|---|---|---|---|---|
| End State | 1 | 2 | 3 | 4 | 5 | 6 | 7 | 8 |
| GOTEOR | . | . | . | . | . | . | . | . |
| GOTBR | Y | . | . | . | . | . | . | . |
| GOTPA | N | . | . | . | . | . | . | . |
| GOTPAN | N | . | . | . | . | . | . | . |
| GOTSK | . | . | . | . | . | . | . | . |
| CNTBL | N | . | . | . | . | . | . | . |
| GOTSP | . | . | . | . | . | . | . | . |
| CNTRBL | N | . | . | . | . | . | . | . |
| GOTIN | . | . | . | . | . | . | . | . |
| GOTUSON | . | . | . | . | . | . | . | . |
| GOTUSOF | . | . | . | . | . | . | . | . |
| GOTHW | . | . | . | . | . | . | . | . |
| GOTCE | . | . | . | . | . | . | . | . |
| GOTFOJU | N | Y | . | . | . | . | . | . |
| GOTTB | N | . | Y | . | . | . | . | . |
| GOTSSDS | N | . | . | Y | . | . | . | . |
| GOTPE | . | . | . | . | . | . | . | . |
| GOTRHON | N | N | N | N | . | . | . | . |
| GOTRFON | N | N | N | N | . | . | . | . |
| GOTCMDR | N | N | N | N | . | . | . | . |
| CNTINC LT CURINC | N | . | . | . | . | . | . | . |
| CNTINC GT CURINC | . | . | . | . | . | . | . | . |
| CNTINC GT ZERO | . | . | . | . | . | . | . | . |
| GOTEOF | . | . | . | . | . | . | . | . |

FIG. 17

| L3 | DCF |
|---|---|
| RCR | .IN h BREAK, h LT CURINC |
| RPE | .PA |
| LFC | .FO, .JU, .TB, .SS, .DS |
| TUFC | .RH, .RF, .CM DRAWER |
| CRE s | .SK v, v GT 0 |
| RSP CRE s | .SP v, v GT 0 |
| CRE RSP s | .SP v, v GT 0 |
| RMLF | None |
| APM | None |
| AAM | None |
| RTMF | None |

FIG. 18

| DECISION TABLE FOR OUTPUT PE | | | | | | | | |
|---|---|---|---|---|---|---|---|---|
| End State | 1 | 2 | 3 | 4 | 5 | 6 | 7 | 8 |
| GOTEOR | . | . | . | . | . | . | . | . |
| GOTBR | . | . | . | . | . | . | . | . |
| GOTPA | . | . | . | . | . | . | . | . |
| GOTPAN | . | . | . | . | . | . | . | . |
| GOTSK | . | . | . | . | . | . | . | . |
| CNTBL | . | . | . | . | . | . | . | . |
| GOTSP | . | . | . | . | . | . | . | . |
| CNTRBL | . | . | . | . | . | . | . | . |
| GOTIN | . | . | . | . | . | . | . | . |
| GOTUSON | . | . | . | . | . | . | . | . |
| GOTUSOF | . | . | . | . | . | . | . | . |
| GOTHW | . | . | . | . | . | . | . | . |
| GOTCE | . | . | . | . | . | . | . | . |
| GOTFOJU | . | . | . | . | . | . | . | . |
| GOTTB | . | . | . | . | . | . | . | . |
| GOTSSDS | . | . | . | . | . | . | . | . |
| GOTPE | Y | . | . | . | . | . | . | . |
| GOTRHON | . | Y | . | . | . | . | . | . |
| GOTRFON | . | . | Y | . | . | . | . | . |
| GOTCMDR | . | . | . | Y | . | . | . | . |
| CNTINC LT CURINC | . | . | . | . | . | . | . | . |
| CNTINC GT CURINC | . | . | . | . | . | . | . | . |
| CNTINC GT ZERO | . | . | . | . | . | . | . | . |
| GOTEOF | . | . | . | . | Y | . | . | . |

FIG. 19

| DECISION TABLE FOR OUTPUT TUP | | | | | | | | |
|---|---|---|---|---|---|---|---|---|
| End State | 1 | 2 | 3 | 4 | 5 | 6 | 7 | 8 |
| GOTEOR | . | . | . | . | . | . | . | . |
| GOTBR | . | . | . | . | . | . | . | . |
| GOTPA | . | . | . | . | . | . | . | . |
| GOTPAN | . | . | . | . | . | . | . | . |
| GOTSK | . | . | . | . | . | . | . | . |
| CNTBL | . | . | . | . | . | . | . | . |
| GOTSP | . | . | . | . | . | . | . | . |
| CNTRBL | . | . | . | . | . | . | . | . |
| GOTIN | . | . | . | . | . | Y | . | . |
| GOTUSON | . | . | . | . | . | . | Y | . |
| GOTUSOF | . | . | . | . | . | . | . | . |
| GOTHW | . | . | . | . | . | . | . | . |
| GOTCE | . | . | . | . | Y | . | . | . |
| GOTFOJU | . | . | . | . | . | . | . | . |
| GOTTB | . | . | . | . | . | . | . | . |
| GOTSSDS | . | . | . | . | . | . | . | . |
| GOTPE | Y | . | . | . | . | . | . | . |
| GOTRHON | . | Y | . | . | . | . | . | . |
| GOTRFON | . | . | Y | . | . | . | . | . |
| GOTCMDR | . | . | . | Y | . | . | . | . |
| CNTINC LT CURINC | . | . | . | . | . | . | . | . |
| CNTINC GT CURINC | . | . | . | . | . | . | . | . |
| CNTINC GT ZERO | . | . | . | . | . | Y | . | . |
| GOTEOF | N | . | . | . | Y | Y | Y | . |

FIG. 20

| DECISION TABLE FOR OUTPUT TUFC | | | | | | | | |
|---|---|---|---|---|---|---|---|---|
| End State | 1 | 2 | 3 | 4 | 5 | 6 | 7 | 8 |
| GOTEOR | . | . | . | . | . | . | . | . |
| GOTBR | . | . | . | . | . | . | . | . |
| GOTPA | . | . | . | . | . | . | . | . |
| GOTPAN | . | . | . | . | . | . | . | . |
| GOTSK | . | . | . | . | . | . | . | . |
| CNTBL | . | . | . | . | . | . | . | . |
| GOTSP | . | . | . | . | . | . | . | . |
| CNTRBL | . | . | . | . | . | . | . | . |
| GOTIN | . | . | . | . | . | . | . | . |
| GOTUSON | . | . | . | . | . | . | . | . |
| GOTUSOF | . | . | . | . | . | . | . | . |
| GOTHW | . | . | . | . | . | . | . | . |
| GOTCE | . | . | . | . | . | . | . | . |
| GOTFOJU | . | . | . | . | . | . | . | . |
| GOTTB | . | . | . | . | . | . | . | . |
| GOTSSDS | . | . | . | . | . | . | . | . |
| GOTPE | . | . | . | . | . | . | . | . |
| GOTRHON | Y | . | . | . | . | . | . | . |
| GOTRFON | . | Y | . | . | . | . | . | . |
| GOTCMDR | . | . | Y | . | . | . | . | . |
| CNTINC LT CURINC | . | . | . | . | . | . | . | . |
| CNTINC GT CURINC | . | . | . | . | . | . | . | . |
| CNTINC GT ZERO | . | . | . | . | . | . | . | . |
| GOTEOF | . | . | . | . | . | . | . | . |

FIG. 21

| DECISION TABLE FOR OUTPUT TOP MP AND TOP MT ||||||||| 
|---|---|---|---|---|---|---|---|---|
| End State | 1 | 2 | 3 | 4 | 5 | 6 | 7 | 8 |
| GOTEOR | . | . | . | . | . | . | . | . |
| GOTBR | . | . | . | . | . | . | . | . |
| GOTPA | . | . | . | . | . | . | . | . |
| GOTPAN | . | . | . | . | . | . | . | . |
| GOTSK | . | . | . | . | . | . | . | . |
| CNTBL | . | . | . | . | . | . | . | . |
| GOTSP | . | . | . | . | . | . | . | . |
| CNTRBL | . | . | . | . | . | . | . | . |
| GOTIN | . | . | . | . | . | . | . | . |
| GOTUSON | . | . | . | . | . | . | . | . |
| GOTUSOF | . | . | . | . | . | . | . | . |
| GOTHW | . | . | . | . | . | . | . | . |
| GOTCE | . | . | . | . | . | . | . | . |
| GOTFOJU | . | . | . | . | . | . | . | . |
| GOTTB | . | . | . | . | . | . | . | . |
| GOTSSDS | . | . | . | . | . | . | . | . |
| GOTPE | . | . | . | . | . | . | . | . |
| GOTRHON | Y | . | . | . | . | . | . | . |
| GOTRFON | . | . | . | . | . | . | . | . |
| GOTCMDR | . | . | . | . | . | . | . | . |
| CNTINC LT CURINC | . | . | . | . | . | . | . | . |
| CNTINC GT CURINC | . | . | . | . | . | . | . | . |
| CNTINC GT ZERO | . | . | . | . | . | . | . | . |
| GOTEOF | . | . | . | . | . | . | . | . |

FIG. 22

| DECISION TABLE FOR OUTPUT BOTTOM MP AND BOTTOM MT | | | | | | | | |
|---|---|---|---|---|---|---|---|---|
| End State | 1 | 2 | 3 | 4 | 5 | 6 | 7 | 8 |
| GOTEOR | . | . | . | . | . | . | . | . |
| GOTBR | . | . | . | . | . | . | . | . |
| GOTPA | . | . | . | . | . | . | . | . |
| GOTPAN | . | . | . | . | . | . | . | . |
| GOTSK | . | . | . | . | . | . | . | . |
| CNTBL | . | . | . | . | . | . | . | . |
| GOTSP | . | . | . | . | . | . | . | . |
| CNTRBL | . | . | . | . | . | . | . | . |
| GOTIN | . | . | . | . | . | . | . | . |
| GOTUSON | . | . | . | . | . | . | . | . |
| GOTUSOF | . | . | . | . | . | . | . | . |
| GOTHW | . | . | . | . | . | . | . | . |
| GOTCE | . | . | . | . | . | . | . | . |
| GOTFOJU | . | . | . | . | . | . | . | . |
| GOTTB | . | . | . | . | . | . | . | . |
| GOTSSDS | . | . | . | . | . | . | . | . |
| GOTPE | . | . | . | . | . | . | . | . |
| GOTRHON | . | . | . | . | . | . | . | . |
| GOTRFON | Y | . | . | . | . | . | . | . |
| GOTCMDR | . | . | . | . | . | . | . | . |
| CNTINC LT CURINC | . | . | . | . | . | . | . | . |
| CNTINC GT CURINC | . | . | . | . | . | . | . | . |
| CNTINC GT ZERO | . | . | . | . | . | . | . | . |
| GOTEOF | . | . | . | . | . | . | . | . |

FIG. 23

| DECISION TABLE FOR OUTPUT BT | | | | | | | | |
|---|---|---|---|---|---|---|---|---|
| End State | 1 | 2 | 3 | 4 | 5 | 6 | 7 | 8 |
| GOTEOR | . | . | . | . | . | . | . | . |
| GOTBR | . | . | . | . | . | . | . | . |
| GOTPA | . | . | . | . | . | . | . | . |
| GOTPAN | . | . | . | . | . | . | . | . |
| GOTSK | . | . | . | . | . | . | . | . |
| CNTBL | . | . | . | . | . | . | .. | . |
| GOTSP | . | . | . | . | . | . | . | . |
| CNTRBL | . | . | . | . | . | . | . | . |
| GOTIN | . | . | . | . | . | Y | . | . |
| GOTUSON | . | . | . | . | . | . | Y | . |
| GOTUSOF | . | . | . | . | . | . | . | . |
| GOTHW | . | . | . | . | . | . | . | . |
| GOTCE | . | . | . | . | Y | . | . | . |
| GOTFOJU | . | . | . | . | . | . | . | . |
| GOTTB | . | . | . | . | . | . | . | . |
| GOTSSDS | . | . | . | . | . | . | . | . |
| GOTPE | Y | . | . | . | . | . | . | . |
| GOTRHON | . | Y | . | . | . | . | . | . |
| GOTRFON | . | . | Y | . | . | . | . | . |
| GOTCMDR | . | . | . | Y | . | . | . | . |
| CNTINC LT CURINC | . | . | . | . | . | . | . | . |
| CNTINC GT CURINC | . | . | . | . | . | . | . | . |
| CNTINC GT ZERO | . | . | . | . | . | Y | . | . |
| GOTEOF | N | . | . | . | Y | Y | Y | . |

FIG. 24

| End State | \multicolumn{8}{c}{DECISION TABLE FOR OUTPUT SPS ATF} |
|---|---|---|---|---|---|---|---|---|
| | 1 | 2 | 3 | 4 | 5 | 6 | 7 | 8 |
| GOTEOR | . | . | . | . | . | . | . | . |
| GOTBR | . | . | . | . | . | . | . | . |
| GOTPA | . | . | . | . | . | . | . | . |
| GOTPAN | . | . | . | . | . | . | . | . |
| GOTSK | . | . | . | . | . | . | . | . |
| CNTBL | . | . | . | . | . | . | . | . |
| GOTSP | . | . | . | . | . | . | . | . |
| CNTRBL | . | . | . | . | . | . | . | . |
| GOTIN | . | . | . | . | . | . | . | . |
| GOTUSON | . | . | . | . | . | . | . | . |
| GOTUSOF | . | . | . | . | . | . | . | . |
| GOTHW | . | . | . | . | . | . | . | . |
| GOTCE | Y | . | . | . | . | . | . | . |
| GOTFOJU | . | . | . | . | . | . | . | . |
| GOTTB | . | . | . | . | . | . | . | . |
| GOTSSDS | . | . | . | . | . | . | . | . |
| GOTPE | . | . | . | . | . | . | . | . |
| GOTRHON | . | . | . | . | . | . | . | . |
| GOTRFON | . | . | . | . | . | . | . | . |
| GOTCMDR | . | . | . | . | . | . | . | . |
| CNTINC LT CURINC | . | . | . | . | . | . | . | . |
| CNTINC GT CURINC | . | . | . | . | . | . | . | . |
| CNTINC GT ZERO | . | . | . | . | . | . | . | . |
| GOTEOF | . | . | . | . | . | . | . | . |

FIG. 25

| DECISION TABLE FOR OUTPUT ITS | | | | | | | | | | |
|---|---|---|---|---|---|---|---|---|---|---|
| End State | 1 | 2 | 3 | 4 | 5 | 6 | 7 | 8 | 9 | 10 |
| GOTEOR | . | . | . | . | . | . | . | . | . | . |
| GOTBR | . | . | . | . | . | . | . | . | . | . |
| GOTPA | N | Y | . | . | . | . | . | . | . | . |
| GOTPAN | N | . | Y | . | . | . | . | . | . | . |
| GOTSK | . | . | . | . | . | . | . | . | . | . |
| CNTBL | . | . | . | . | . | . | . | . | . | . |
| GOTSP | . | . | . | . | . | . | . | . | . | . |
| CNTRBL | . | . | . | . | . | . | . | . | . | . |
| GOTIN | . | . | . | . | . | . | . | . | . | Y |
| GOTUSON | . | . | . | . | . | . | . | . | . | . |
| GOTUSOF | . | . | . | . | . | . | . | . | . | . |
| GOTHW | . | . | . | . | . | . | . | . | . | . |
| GOTCE | . | . | . | . | . | . | . | . | . | . |
| GOTFOJU | N | . | . | Y | . | . | . | . | . | . |
| GOTTB | N | . | . | . | Y | . | . | . | . | . |
| GOTSSDS | N | . | . | . | . | Y | . | . | . | . |
| GOTPE | . | . | . | . | . | . | . | . | . | . |
| GOTRHON | N | . | . | . | . | . | Y | . | . | . |
| GOTRFON | N | . | . | . | . | . | . | . | . | . |
| GOTCMDR | N | . | . | . | . | . | . | Y | . | . |
| CNTINC LT CURINC | -N | . | . | . | . | . | . | . | Y | . |
| CNTINC GT CURINC | Y | . | . | . | . | . | . | . | . | . |
| CNTINC GT ZERO | -Y | Y | Y | Y | Y | Y | Y | Y | Y | Y |
| GOTEOF | N | N | N | N | N | N | N | N | N | Y |

FIG. 26

| L3 | DCF |
|---|---|
| RCR | .IN h, h LT CURINC |
| IRT | None |
| RPE | .PA |
| LFC | .FO, .JU, .TB, .SS, .DS |
| TUFC | .RH, .RF, .CM DRAWER |
| RMLF | None |
| APM | None |
| AAM | None |
| RTMF | None |

FIG. 27

| DECISION TABLE FOR OUTPUT BUS | | | | | | | | |
|---|---|---|---|---|---|---|---|---|
| End State | 1 | 2 | 3 | 4 | 5 | 6 | 7 | 8 |
| GOTEOR | . | . | . | . | . | . | . | . |
| GOTBR | . | . | . | . | . | . | . | . |
| GOTPA | . | . | . | . | . | . | . | . |
| GOTPAN | . | . | . | . | . | . | . | . |
| GOTSK | . | . | . | . | . | . | . | . |
| CNTBL | . | . | . | . | . | . | . | . |
| GOTSP | . | . | . | . | . | . | . | . |
| CNTRBL | . | . | . | . | . | . | . | . |
| GOTIN | . | . | . | . | . | . | . | . |
| GOTUSON | Y | . | . | . | . | . | . | . |
| GOTUSOF | . | . | . | . | . | . | . | . |
| GOTHW | . | . | . | . | . | . | . | . |
| GOTCE | . | . | . | . | . | . | . | . |
| GOTFOJU | . | . | . | . | . | . | . | . |
| GOTTB | . | . | . | . | . | . | . | . |
| GOTSSDS | . | . | . | . | . | . | . | . |
| GOTPE | . | . | . | . | . | . | . | . |
| GOTRHON | . | . | . | . | . | . | . | . |
| GOTRFON | . | . | . | . | . | . | . | . |
| GOTCMDR | . | . | . | . | . | . | . | . |
| CNTINC LT CURINC | . | . | . | . | . | . | . | . |
| CNTINC GT CURINC | . | . | . | . | . | . | . | . |
| CNTINC GT ZERO | . | . | . | . | . | . | . | . |
| GOTEOF | . | . | . | . | . | . | . | . |

FIG. 28

| DECISION TABLE FOR VARIABLE CURHW | | | | | | | | |
|---|---|---|---|---|---|---|---|---|
| End State | 1 | 2 | 3 | 4 | 5 | 6 | 7 | 8 |
| GOTEOR | . | . | . | . | . | . | . | . |
| GOTBR | . | . | . | . | . | . | . | . |
| GOTPA | . | . | . | . | . | . | . | . |
| GOTPAN | . | . | . | . | . | . | . | . |
| GOTSK | . | . | . | . | . | . | . | . |
| CNTBL | . | . | . | . | . | . | . | . |
| GOTSP | . | . | . | . | . | . | . | . |
| CNTRBL | . | . | . | . | . | . | . | . |
| GOTIN | . | . | . | . | . | . | . | . |
| GOTUSON | . | . | . | . | . | . | . | . |
| GOTUSOF | . | . | . | . | . | . | . | . |
| GOTHW | Y | . | . | . | . | . | . | . |
| GOTCE | . | . | . | . | . | . | . | . |
| GOTFOJU | . | . | . | . | . | . | . | . |
| GOTTB | . | . | . | . | . | . | . | . |
| GOTSSDS | . | . | . | . | . | . | . | . |
| GOTPE | . | . | . | . | . | . | . | . |
| GOTRHON | . | . | . | . | . | . | . | . |
| GOTRFON | . | . | . | . | . | . | . | . |
| GOTCMDR | . | . | . | . | . | . | . | . |
| CNTINC LT CURINC | . | . | . | . | . | . | . | . |
| CNTINC GT CURINC | . | . | . | . | . | . | . | . |
| CNTINC GT ZERO | . | . | . | . | . | . | . | . |
| GOTEOF | . | . | . | . | . | . | . | . |

FIG. 29

| DECISION TABLE FOR OUTPUT SPECIAL PE | | | | | | | | |
|---|---|---|---|---|---|---|---|---|
| End State | 1 | 2 | 3 | 4 | 5 | 6 | 7 | 8 |
| GOTEOR | . | . | . | . | . | . | . | . |
| GOTBR | . | . | . | . | . | . | . | . |
| GOTPA | . | . | . | . | . | . | . | . |
| GOTPAN | . | . | . | . | . | . | . | . |
| GOTSK | . | . | . | . | . | . | . | . |
| CNTBL | . | . | . | . | . | . | . | . |
| GOTSP | . | . | . | . | . | . | . | . |
| CNTRBL | . | . | . | . | . | . | . | . |
| GOTIN | . | . | . | . | . | Y | . | . |
| GOTUSON | . | . | . | . | . | . | Y | . |
| GOTUSOF | . | . | . | . | . | . | . | . |
| GOTHW | . | . | . | . | . | . | . | . |
| GOTCE | . | . | . | . | Y | . | . | . |
| GOTFOJU | . | . | . | . | . | . | . | . |
| GOTTB | . | . | . | . | . | . | . | . |
| GOTSSDS | . | . | . | . | . | . | . | . |
| GOTPE | . | . | . | . | . | . | . | . |
| GOTRHON | . | Y | . | . | . | . | . | . |
| GOTRFON | . | . | Y | . | . | . | . | . |
| GOTCMDR | . | . | . | Y | . | . | . | . |
| CNTINC LT CURINC | . | . | . | . | . | . | . | . |
| CNTINC GT CURINC | . | . | . | . | . | . | . | . |
| CNTINC GT ZERO | . | . | . | . | . | Y | . | . |
| GOTEOF | . | Y | Y | Y | Y | Y | Y | . |

FIG. 30

| DECISION TABLE FOR OUTPUT EU | | | | | | | | |
|---|---|---|---|---|---|---|---|---|
| End State | 1 | 2 | 3 | 4 | 5 | 6 | 7 | 8 |
| GOTEOR | . | . | . | . | . | . | . | . |
| GOTBR | . | . | . | . | . | . | . | . |
| GOTPA | . | . | . | . | . | . | . | . |
| GOTPAN | . | . | . | . | . | . | . | . |
| GOTSK | . | . | . | . | . | . | . | . |
| CNTBL | . | . | . | . | . | . | . | . |
| GOTSP | . | . | . | . | . | . | . | . |
| CNTRBL | . | . | . | . | . | . | . | . |
| GOTIN | . | . | . | . | . | . | . | . |
| GOTUSON | . | . | . | . | . | . | . | . |
| GOTUSOF | . | . | . | . | . | . | . | . |
| GOTHW | . | . | . | . | . | . | . | . |
| GOTCE | . | . | . | . | . | . | . | . |
| GOTFOJU | . | . | . | . | . | . | . | . |
| GOTTB | . | . | . | . | . | . | . | . |
| GOTSSDS | . | . | . | . | . | . | . | . |
| GOTPE | . | . | . | . | . | . | . | . |
| GOTRHON | . | . | . | . | . | . | . | . |
| GOTRFON | . | . | . | . | . | . | . | . |
| GOTCMDR | . | . | . | . | . | . | . | . |
| CNTINC LT CURINC | . | . | . | . | . | . | . | . |
| CNTINC GT CURINC | . | . | . | . | . | . | . | . |
| CNTINC GT ZERO | . | . | . | . | . | . | . | . |
| GOTEOF | Y | . | . | . | . | . | . | . |

FIG. 31

METHODOLOGY FOR TRANSFORMING A FIRST EDITABLE DOCUMENT FORM PREPARED WITH A BATCH TEXT PROCESSING SYSTEM TO A SECOND EDITABLE DOCUMENT FORM USABLE BY AN INTERACTIVE OR BATCH TEXT PROCESSING SYSTEM

BACKGROUND OF THE INVENTION

1. Field of the Invention

This invention is concerned with a methodology for transforming editable documents cast in a first form by and for use in a batch text processing system into a second editable form for use in and by another text processing system, either of the interactive or batch type, in which said first form is otherwise incompatible. More particularly, this invention is directed to achieving the requisite transformation between dissimilar forms of an editable document by utilizing methodology that effects the transform of a sequence of input items from the batch source form to an explicit set of output items for the editable target document form based on suitably selected state variables representing the sequence of input items.

2. Description of the Prior Art

Several different forms are known and commonly used for representing editable or revisable documents in information handling systems. Some examples are OIIA L3 used by Displaywriter and 5520 Systems, a form often called "Two-Baker" used by 3790 and DOSF/DPCX/8100, and the DCF input form used by Document Composition Facility and Professional Office System. Displaywriter is a word processor, capable of and primarily intended for stand-alone operation, manufactured and sold by International Business Machines Corporation (IBM Corporation). It is a type of text processor commonly known as a "what you see is what you get" or interactive system. The 5520 is a shared logic, multi-station text processing and office communication system that is also sold by IBM Corporation. The 3790, classifiable as a minicomputer, is an intelligent text processing system. The 8100, which is also classifiable as a minicomputer, is adapted using DOSF, a text processing package, and DPCX, a special operating system, as a text processing system. Both the 3790 and 8100 are manufactured and sold by IBM Corporation. Document Composition Facility (DCF) or SCRIPT/VS is a text processing program product sold by IBM Corporation. The Professional Office System or PROFS is a menu driven program product sold by IBM Corporation that is designed and particularly suitable for handling and managing a wide spectrum of office related tasks. It includes text processing capabilities that utilize the DCF form of editable text representation. In this type of text processing system, the operator imbeds textual matter in the document that is subsequently interpreted as one or more formatting commands and is retained in the editable document form as textual matter. This document form, when subsequently interpreted, is formatted as a whole document or batch processed.

These are several of the available text processing systems from IBM Corporation that can be employed to create, manipulate and format editable documents. There are also many other fine text processing systems and software support therefor available from other suppliers. Due to the overwhelming number of text processing systems now available, it is not uncommon to have a diverse mix of different text processors at any particular installation. However, due to incompatibility in and between the editable documents produced by the various text processing systems, it has been extremely difficult to provide a document form transformation capability for different people who need to cooperate in creating and editing a given document. Further, that need contemplates that each party involved in editing the document be provided with several opportunities to do so. This need cannot be efficiently or effectively supported in an operating environment that uses text processors having impenetrable system boundaries.

There are obvious and important benefits to be derived from transforming documents generated in a known form by a first text processing system, into another form that is useable and fully editable on a different text processing system. Without such transformation capability, documents prepared on any one of the known systems are meaningless to and unmodifiable by users of other systems. However, the provision of a transformation capability is not a straightforward or simple endeavor. It will be understood by those having skill in this art that the required transformation facility necessary to permit a first form document to be converted into a second form document that can be edited on a different and otherwise incompatible text processing system involves more than just a mere one-for-one replacement or substitution formula.

One known prior art example of a transformation methodology is provided by the Document Interchange Facility or DIF. This IBM Corporation program product is provided to convert "Two-Baker" form editable files into DCF form files by using uniquely defined SCRIPT macros. These macros essentially invoke a block of information for each of the "Two-Baker" commands encountered, but the substituted material is not an equivalent DCF command. While it does permit a final formatted version of the original "Two-Baker" document to be produced by a DCF based text processing system, using the translated file containing these macros, this DIF converted data stream cannot be easily edited or effectively manipulated because that data stream is atypical, it is not a normal DCF file. This approach permits the formatting of a document cast in a first editable form in a text processor designed for documents of a second form, but does not allow for editing of the "transformed" document at any point prior thereto.

OBJECTS AND SUMMARY OF THE INVENTION

Accordingly, it is a principal object of the present invention to provide a methodology for transforming a document cast in a source editable form by a batch text processing system, which form is suitable for editing or formatting only in said batch text processing system, into another editable or target form that is fully suitable for editing and formatting in a corresponding type of targeted text processing system.

It is also a principal object of the present invention to provide such a methodology wherein said transformation is transparent to the users of said text processing systems and does not require their intervention to effect the transformation.

It is another object of the present invention to provide methods of transforming a data stream from one document form to another in a quick and efficient manner that does not unnecessarily tie up system resources.

It is yet another object of the present invention to provide such methods wherein the second document form produced by said transformation is explicit and clear, having no impediments to editability thereof by a user of said targeted text processing system.

These and other objects of the present invention are achieved by a methodology of transformation wherein a fixed number of key state variables are defined as an initial step in the present invention. These key state variables are used to hold information concerning source document controls that have been read in a sequence thereof. The next step requires a definition of control compatibility, which source document controls are compatible with other source controls that are recorded in state variables that have been set in the sequence. After control compatibility has been determined, it will be necessary to define all of the output items that may need to be written for the target document as part of the transformation of any possible input sequence. With respect to the output items thus defined, establish an ordering of these items so that they will be uniformly handled in the transformation. Then, for each possible output item, determine a set of rules which will govern when and if that output item gets written to the target document based on the value of the key variables in response to a particular sequence of input items that have been read from the source document. The output item is written if any one or more of the rules is satisfied. Text, when encountered, is defined as always ending a sequence and thereby initiating a write, if appropriate, to the target document.

BRIEF DESCRIPTION OF THE DRAWINGS

The invention will be described further, by way of a preferred example thereof, with reference to the accompanying drawings wherein like reference numerals have been used in the several views to depict like elements, in which:

FIG. 2 sets forth, in tabular form, an explanation for each of the state variables that are set when reading a sequence of DCF controls in accordance with the present invention;

FIGS. 3A through 3C summarizes the effect of certain DCF controls on the state variables set forth in FIG. 2;

FIG. 4 summarizes certain L3 control abbreviations and their meanings, ordered in accordance with the present invention;

FIG. 5 illustrates a decision table showing the rules that determine the ordering of the FIG. 4 table, said rules being represented by the columns of this table;

FIGS. 6 and 7 depict the remainder of the rules that determine the ordering of the table in FIG. 4, said rules again being represented by the columns of these tables;

FIG. 8 illustrates the decision table for the implications among the DCF controls considered in the tables of FIGS. 5, 6 and 7;

FIGS. 9A and 9B show decision tables of tabulated summaries of the transformation to the L3 control CRE;

FIG. 10 sets forth a decision table of a tabulated summary of the transformation to the L3 control RCR;

FIG. 11 illustrates a decision table of a tabulated summary of the transformation to the L3 control set consisting of several CREs;

FIG. 12 depicts a decision table of a tabulated summary of the transformation to the L3 controls consisting of several repetitions of the couplet (RSP CRE);

FIG. 13 shows a decision table of a tabulated summary of the transformation to the L3 controls consisting of several repetitions of the couplet (CRE RSP);

FIG. 14 sets forth a decision table of a tabulated summary of the transformation to the L3 control EUS;

FIG. 15 illustrates a decision table of a tabulated summary of the transformation to the L3 control RPE;

FIG. 16 depicts a decision table of a tabulated summary of the transformation to the L3 control LFC;

FIG. 17 shows a decision table of a tabulated summary of the transformation to the L3 control ZICR;

FIG. 18 sets forth a table that summarizes the relationship between L3 items that end a paragraph and the DCF controls that are transformed into these L3 items;

FIG. 19 illustrates a decision table of a tabulated summary of the transformation to the L3 control PE;

FIG. 20 depicts a decision table of a tabulated summary of the transformation to the L3 control TUP;

FIG. 21 shows a decision table of a tabulated summary of the transformation to the L3 control TUFC;

FIG. 22 sets forth a decision table of a tabulated summary of the transformation to the L3 controls for Top MP and Top MT;

FIG. 23 illustrates a decision table of a tabulated summary of the transformation to the L3 controls for Bottom MP and Bottom MT;

FIG. 24 depicts a decision table of a tabulated summary of the transformation to the L3 control BT;

FIG. 25 shows a decision table of a tabulated summary of the transformation to the L3 controls of several SPs and ATF;

FIG. 26 illustrates a decision table of a tabulated summary of the transformation to the L3 control of several ITs;

FIG. 27 shows a tabulated summary of the DCF controls in a given sequence that require the insertion of ITs into the L3 document;

FIG. 28 sets forth a decision table of a tabulated summary of the transformation to the L3 control for BUS;

FIG. 29 illustrates a decision table of a tabulated summary of the transformation that sets key variable control CURHW;

FIG. 30 depicts a decision table of a tabulated summary of the transformation to the L3 control SPECIAL PE; and FIG. 31 shows a decision table of a tabulated summary of the transformation to the control EU.

DESCRIPTION OF THE PREFERRED EMBODIMENT

Figure 1:
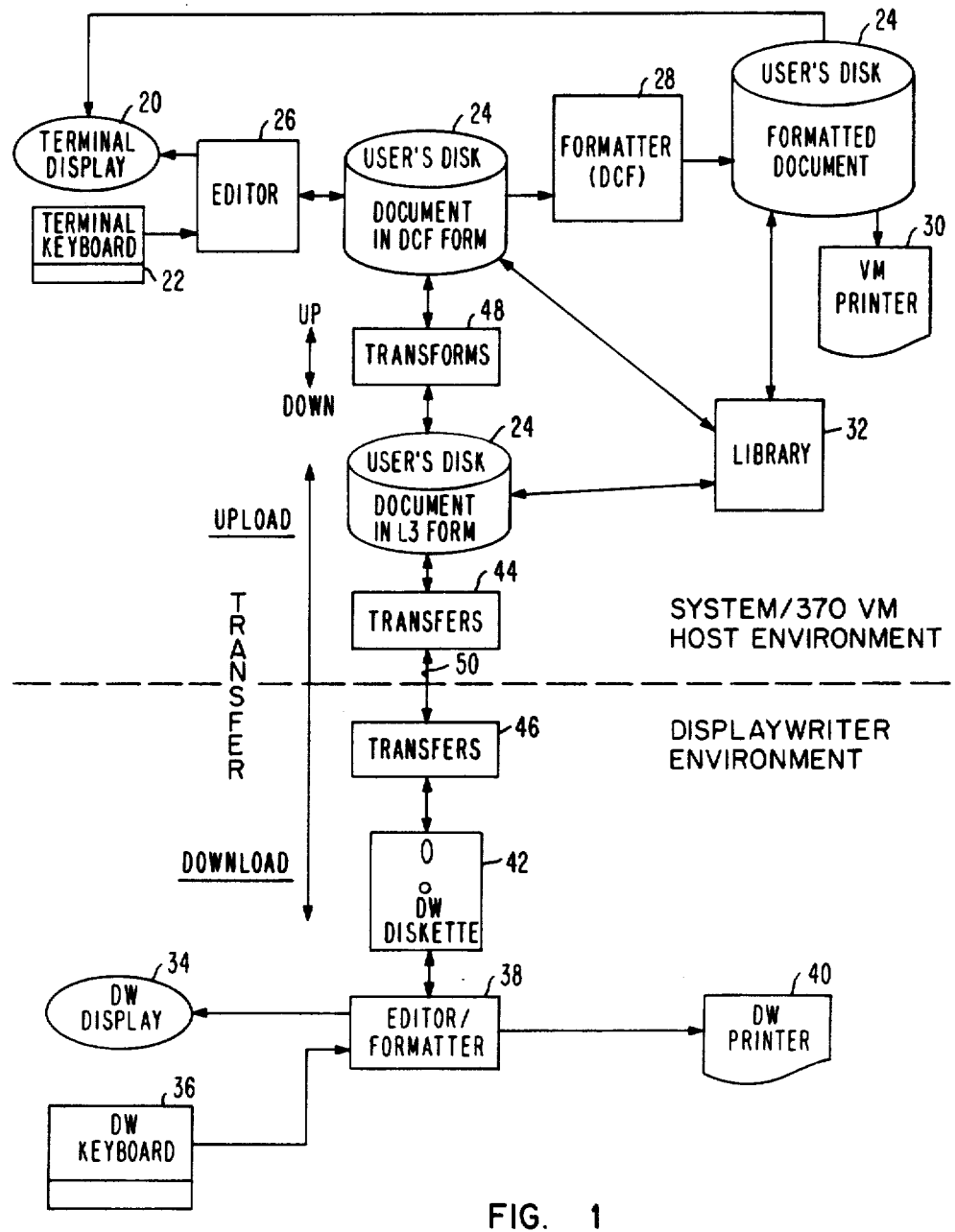
FIG. 1 schematically illustrates a simplified representation of a unified, but separable configuration of two text processing systems adapted to transform and then transfer editable documents from one text processing system to the other in accordance with the subject invention.

As used herein, the term "transform mechanism" refers to a collection of software and hardware which in its entirety represents a state machine that takes its input from a source document form and transforms that input in accordance with predefined state transition diagrams and tables into an explicit target document form. Both the source and target document forms are fully editable, although incompatible, hence the need for transformation. In addition, the phrases "DCF document form" and "L3 document form" are intended to be and are used herein as descriptors for two data streams that represent editable or versions of a particular document as it exists on a user's disk or in transfer between two text processing systems. An input item in a source document indicates either a text character or a control item.

As previously noted, there are several different and incompatible forms used in which an editable document can be represented. However, due to inherent disparities between forms, it is impossible to readily move editable document data streams from one text processor to another for editing purposes although the advantages to be gleaned thereby would be significant. The typical mix of incompatible text processing systems, in even a modest installation and the investment they represent, renders such a capability important. It would be particularly advantageous to be able to move a document from a first text processing system to a second and back again, or even to a third or fourth type text processor, as many times as would be needed, to effect creation and complete editing of the document, without concern for the incompatibility of the respective document forms.

A large and increasing number of principals use data processing terminals, such as those of the IBM Corporation's 3270 family, for many tasks, particularly word processing. A concomitant number of secretaries use Displaywriters (DWs) for word processing. Connecting DWs to host data processing systems allows principals and secretaries to cooperate in the creation, editing, and distribution of text documents. Such a connection must include a capability to effect a transformation between the form in which data processing systems represent documents and the form in which DW represents documents. This transformation is exceedingly difficult to effect, as shall hereinafter be explained, because it can not be performed one item at a time.

OIIA L3, or Office Information Interchange Architecture Level 3, an IBM Corporation designation, a document data stream form that was previously mentioned, is the form used in IBM Corporation's Displaywriter (DW). It shall hereinafter be referred to as L3. DCF, or Document Composition Facility, another IBM Corporation designation, is a second document data stream form that was also previously mentioned. This is the form used for representing editable documents using SCRIPT/VS, for example, in a VM environment on an IBM Corporation System 370 data processor.

One possible interconnection arrangement that can be used to couple a host processor, a System/370 operating in a VM environment, and a stand-alone Displaywriter (DW) is shown in FIG. 1. In the typical situation, a principal is provided with a terminal display 20 and keyboard 22 that are coupled to the host processor. In this example environment, the principal is also provided with other system capabilities, such as a disk 24, an editor 26 and, in this instance, a DCF (SCRIPT/VS) based formatter 28. Hard copy can be produced by spooling files to the system printer 30. In addition, if the need arises, the principal can access the system library 32 and download any appropriate file therefrom to their user disk 24. The library 32 is also available to the principal for archival storage purposes. The principal would create or edit a document by interacting with terminal 20 and keyboard 22, using any additional tools as needed.

The secretary, on the other hand, employs a Displaywriter to create and edit textual matter or documents. DW provides its own display 34 and keyboard 36. It is very easy to use because you see on the display screen what you will get on the printer. The DCF to L3 transform capability allows both secretaries and professionals to utilize their respective text processing and editing capabilities in a fully cooperative manner. It allows a secretary to view and edit documents entered or edited by their principal. A related L3 to DCF transform, which uses very different methods, and a facility for host control of the DW diskette files permits the principal to view and edit documents entered or edited by the secretary. In referring to the transfer of documents and the transformation of document files, "UP" will be used herein to indicate a transform from L3 to DCF and "DOWN" will be used to indicate a transform from DCF to L3. The term "upload" will be used to signify that the direction of information transfer is from DW to the host. The term "download" will be employed to signify that the direction of information transfer is from the host to DW. Further details of the L3 to DCF transform and the DW diskette control facility can be found respectively in commonly assigned and copending patent applications by Agnew et al.

Both L3 and DCF represent editable forms of documents. However, their similarity ends at about that point. Both can represent roughly the same important text concepts, such as specifying the end of a line, the end of a paragraph, an amount of indentation, the end of an indentation, the end of a page, the beginning or end of double spacing, or the beginning or end of formatting. However, there is no case in which a control that represents any given set of one or more of these concepts in the DCF form matches a control that represents the same set of concepts in the L3 form.

For example, the "break" control in DCF, written ".BR", ends a paragraph. This is, it prevents the DCF formatter from concatenating following text with preceding text to fill out a line. A "Required Carrier Return" or RCR control in L3, appearing as the unprintable hexadecimal value '06' in the L3 data stream also ends a paragraph by breaking concatenation. However, the RCR does other things as well. An RCR also ends indentation, resets the temporary left margin back to the permanent left margin. It then moves the current position to that permanent position on the next line. For example, four RCRs between two strings of text leaves three blank lines between the lines of text, whereas four ".BRs" between two strings of text leaves no blank lines at all.

As another example, the "tab" control in DCF, written ".TB a b c . . . ", sets tabs stops at the specified character positions a, b, c, etc. The normal method of setting tabs in L3 employs the four "multi-byte" controls "begin line format change", "set line parameters", "set tabs", and "end line format change". Each has its own unprintable hexadecimal representation in the L3 data stream. None can be present in the data stream without the other three. The four multi-byte controls in the "set line parameters" sequence total over 30 bytes and must contain such other information as the font width, left and right margins, line spacing, adjust state, and alignment state. No defaults are possible and there is no way to say "leave the existing value unchanged" for any of this information.

As a third example, the DCF control ".IN h" can specify indentation to any horizontal character position "h", which can be to the left or to the right of the previous indentation position. In L3, on the other hand, all indentations are to tab stop settings. Moreover, the only way to increase the indentation is to use the indent tab (IT) control to move the temporary left margin rightward one more tab setting. The only way to decrease the indentation is to first use one of the several available controls, such as Required Carrier Return, that resets the temporary left margin all the way left to the permanent left margin. Therefore, transforming DCF to L3 is sufficiently difficult because the two forms represent the same information in such different ways. This difficulty of this transformation is compounded by a more fundamental reason.

Except in a few trivial special cases, a DCF item can not be transformed to one or more L3 items in a vacuum, that is by itself, without considering the other DCF items around it. For example, an End Of Record (EOR) between two text records must be transformed into a Carrier Return (CRE). However, the pair consisting of an EOR and a ".IN 0" control, which resets indentation, must be transformed into a Required Carrier Return (RCR). Transforming the EOR into a CRE and then transforming the ".IN 0" into a RCR is erroneous because that would leave an incorrect blank line in the text. In addition, the triad consisting of an EOR, a ".IN 0" control, and a ".PA" control, which ends a page, must be transformed into the PE control and also into zero or more Indent Tab (IT) controls to reestablish the previous indent level. However, the pair of DCF controls ".PA" and ".IN 0", together, in either order, both end the page and reset the indent level. Therefore, they can both be transformed into the single L3 item RPE. It would be an error to transform the ".PA" into a RPE and some ITs, then try to transform the ".IN 0" into something that resets the indent level. There is nothing in L3 that can reset the indent level without leaving an incorrect blank line.

In other cases, transforming a DCF item without considering the item's environment would not be wrong, but would be very clumsy. A Line Format Change (LFC) sequence of multi-byte controls in L3 can perform the function of at least four DCF controls such as the following ones:

.FO OFF: Turns formatting off
.IN 0: Unindents
.TB 5 10 15 20 25: Sets a tab rack
.DS: Sets double spacing It would be possible to transform a sequence of four such DCF controls into four separate LFC sequences. It is far preferable to collect the four DCF controls into a group and transform the entire group into a single LFC sequence.

Therefore, transforming a DCF document into an equivalent L3 document requires recognition of patterns in the DCF document. The number of possible patterns is astronomical. The number of sequences containing each of the 17 most common DCF controls, i.e., the number of permutations of X things taken X at a time, exceeds the number of seconds in the age of the universe by a factor of about 5,000. Not all sequences have a length of only 17, and nothing says that a given DCF control may occur only once in a sequence, so the total number of possible sequences is even larger than the minimum number comprehended. Just recognizing each possible sequence is a task that does not permit a brute-force solution. Defining a suitable transformation into L3 for each sequence requires even more subtlety.

The transformation methodology disclosed here has three main parts. The first part involves reading a sequence of DCF controls, setting appropriate state bits and values for each control that is encountered, testing for text, which always ends a sequence, and testing for certain control combinations that also must end a sequence. The key to the transformation of DCF form to L3 form lies in the second part of the methodology according to the present invention. That key is the recognition that an ordering can be defined on the set of possible L3 items that may need to be written out as the transformation of any DCF sequence. If an L3 item must be written out as part of the transformation of any sequence of DCF controls, no matter in what order the DCF controls appeared, then that L3 item may be written out at a particular place with respect to other L3 items that may have to be written out. The third part of the method involves using the state bits and values that represent what was encountered in an ended sequence and writing out the appropriate L3 items that are the transformation of that sequence. Decisions as to whether or not to write out each possible item are made in the order determined by the second aspect of the transformation methodology. Therefore, the third part of the transformation consists of using a large set of decision tables in a carefully selected, but fixed, order. Each decision table determines whether or not to write out a particular L3 item.

The ensuing description of the preferred embodiment of the present invention gives the details of the three main aspects of the transformation methodology disclosed herein. The first portion of this description sets forth the details of the processing that is done while reading the DCF controls that constitute a particular sequence. It involves setting the appropriate state bits and variables. The second portion of this description gives the ordering of the L3 items that may have to be written out as the transformation of any sequence of DCF controls. The ordering is independent of what controls were in the sequence. The third and last portion of this description details the nature of the processing that is done after reaching the end of a particular sequence. It involves deciding whether or not to write out each of the possible L3 items as the transformation of that particular sequence, based on the state bits and variables that were set while reading the sequence.

The bits and values that are set while reading a sequence of DCF controls are shown in the table of FIG. 2. Several of these state variables, such as "VALTP", have corresponding persistent state variables such as "CURTP". The processing that takes place while reading a sequence of DCF controls consists of setting, and sometimes resetting, the above state bits and variables, is shown in FIGS. 3A through 3C.

The ordering of L3 items that may or may not have to be written out as part of the transformation of a given sequence of DCF controls follows. That is, the second part of this transformation method consists of either writing or not writing each of these items in the order illustrated in the table of FIG. 4.

The above ordering is very far from arbitrary. It is the key to the transformation method. It was selected based on the information represented in the tables shown in FIGS. 5 through 7 and the accompanying explanations thereof. In any one "rule", or column in a table, an item marked with a "1" must precede any item marked with a "2". The items are ordered so that numbers in any rule increase going downward.

The following is an explanation of the decision tables for item ordering that are shown in FIGS. 5 through 7. The "Rule" number precedes each explanatory comment.

1. A ZICR is used only with CRE, to end a paragraph, i.e. to break line adjusting and to inhibit prior line justification, or with LFC to force the changes to take effect immediately rather than on the next line. Hence, if CRE and ZICR or LFC and ZICR are both present, then they are in that order. A ZICR is never necessary for both purposes because an LFC ends a paragraph.

2. Blank lines, generated as part of the transformation of a sequence of DCF controls that contain a page end, always go on the prior page. Any blank lines on the following page have to end the sequence of controls because a single count of blank lines fails to tell the whole semantics of the sequence.

3. A given sequence may generate both an RPE and a PE from a ".PA" control and a PE byte respectively, but only in that order. The other order implies a blank page and would end the sequence of DCF controls before the ".PA" control.

4. L3 syntax rules require a TUP to follow a PE.

5. L3 syntax rules require a TUFC to follow a TUP.

6. L3 syntax rules require a MP to follow a TUFC.

7. L3 syntax rules require a MT to follow a MP. Note that either or both top and bottom margin text can appear in a given sequence of controls. If both appear, then the top (header) margin text's MP and MT must come before the bottom (footer) margin text's MP and MT.

8. L3 syntax rules require a BT to follow a TUP. However, no separate algorithm is needed to decide whether or not to write out a BT since a TUP implies a subsequent BT.

9. An End UnderScore, if any, must precede the spaces that position an Align Text Field to avoid underscoring of those spaces.

10. Any End UnderScore must precede spaces present in the data stream generated by INDENT TAB, to avoid underscoring those spaces.

11. Any Begin UnderScore must follow the 33 spaces that position an Align Text Field and, for simplicity, must therefore follow the ATF itself to avoid underscoring those spaces.

12. Any Begin UnderScore must follow spaces present in the data stream generated by INDENT TAB, to avoid underscoring those spaces.

13. Any Indent Tab, which is used to increase the indentation by moving the temporary left margin to the right, must follow any of the L3 controls that reset the temporary left margin back to the permanent left margin.

14. Any Indent Tabs in the last record processed as part of a sequence of DCF controls that contain a ".CE" control must follow the ATF as the first part of the text to be centered.

15. In response to an End Of File in the DCF document, it is necessary to end the current BT with a PE and write out an End Unit, i.e., End Unit Prefix and a new Body Text containing only a Page End.

16. This rule unintentionally left blank.

17. When RCR overrides CRE, the RCR must precede the first RSP in a sequence of one or more pairs of RSP-CRE that give one or more required blank lines. Otherwise, that first RSP would go at the end of a text line rather than at the start of its own required blank line.

18. When RCR overrides CRE, and RCR must precede and LFC, if any, so that the LFC follows a valid single-byte line ending control.

Some ordering is affected by relations among items that take the form "whenever you write out item A you must, at some point, write out item B." The table illustrated in FIG. 8 expresses each such relation as a column in which A has a "Y" (meaning "yes") and B has a "—Y" (meaning "implied yes"). This is a decision table for implications among the input items. The "Rule" number precedes each explanatory comment.

1. A Text Unit Format Change can appear only at the start of a new logical page, so TUFC implies Page End, Text Unit Prefix, and Body Text.

2. Margin Text can change only at the start of a new logical page at which there is a Text Unit Format Change, so Margin text Parameters implies Page End, Text Unit Prefix, Margin Text, which could equally be said to imply Margin text Parameters and the rest, TUFC, and BT. Note that presence of top and bottom margin texts are independent decisions.

In the ordered list, PE precedes TUFC and MP, but either TUFC or MP implies a need for PE. Moreover, TUFC precedes MP, but MP implies a need for TUFC.

The decision tables shown in FIGS. 9 through 31 and their accompanying explanations tell, for each possible state of the variables set while reading a sequence of DCF controls, whether or not to write out the posssible L3 items. Each table tells whether or not to write the corresponding item. Each column of a table is a "rule", i.e., a condition under which the relevant item is to be written out. In general, none, one, some, or even all of the rules may be true at the end of reading a particular sequence of DCF controls. The item is to be written out if any one or more of the rules in its decision table are "satisfied". A rule is satisfied if each of the variables marked with a "Y" in that column is nonzero and each variable marked with a "N" in that column is zero.

At the end of a sequence of DCF controls, bits and values will have been set to tell what was in the sequence. The rest of the transformation method consists of applying decision tables in a fixed sequence to decide whether or not to write out each of the possible L3 items. Each decision table applied to one L3 item. That L3 item is to be written out if any rule (column) of its decision table is satisfied, it has "Y"s and "N"s that agree with the current values of the variables.

The decision table for CRE is shown in FIGS. 9A and 9B. The Carrier REturn or CRE serves to move the current position of the next character to be printed to the temporary left margin of the next line. There are many input items that can be in a sequence of DCF controls that require DOWN to write a CRE into the L3 data stream, as DOWN starts to transform an ended sequence of DCF controls. The hierarchy of such DCF items is as follows:

(a) one DCF input item transforms directly into a CRE unless overridden by a RCR or RPE:

EOR (b) one DCF input item transforms directly into a combination CRE ZICR that starts with a CRE unless the combination is overridden by a RCR or RPE:

Any control that causes a break (c) Some DCF input items transform to L3 output items that must follow a line ender and hence must follow a CRE unless the CRE is overridden by a RCR or RPE:

.FO, .JU, .TB, .SS, or .DS, which transform to a LFC unless something else needs a TUFC (d) some DCF input items transform to L3 output items that must follow a PE which, in turn, must follow a line ender and hence must follow a CRE unless the CRE is overridden by a RCR or RPE:

.RH which transforms to TUFC

.RF which transforms TO TUFC

.CM DRAWER which transforms to TUFCO

.EOF which transforms to EU

Restating that, the following DCF input items transform to L3 input items that start with CRE, unless a RCR from .IN h with h LT CURINC or RPE from .PA overrides the CRE. For rule 1, EOR transforms to CRE. Using rule 2, any control that causes a break transforms to CRE ZICR, if there is no other breaker. With rule 3, PE byte transforms to CRE PE. In rules 4, 5, and 6, input items .FO, .JU, .TB, .SS, and .DS transform to CRE LFC or else transform to CRE PE TUP TUFC, maybe MP MT, and BT. Rules 7, 8 and 9 treat DCF input items .RH, .RF and CM DRAWER by transforming them to CRE PE TUP TUFC, maybe MP MT, and BT. Lastly, rule 10 says that EOF transforms to CRE PE EU, that is, to CRE PE EUP CRE and PE.

That gives 10 rules in the decision table. It seems to leave out several controls, namely .SK, .SP, and .CE, that clearly do need to be set up by a CRE. In fact, these are all included in Rule 2 because each of them causes a BREAK and therefore sets GOTBR. Note that the rules for writing out a CRE are by no means mutually exclusive. The number of disjoint situations that require a CRE is at least two to the eleventh power. At least eleven different DCF controls may or may not occur in a given sequence that requires a CRE at the start of its transformation to L3. The decision table for CRE is shown in FIGS. 9A and 9B.

A Required Carrier Return or RCR is used to unindent, that is, to move the temporary left margin back to the permanent left margin, in two cases. The first case occurs when the last .IN h control in a sequence has h equal to zero, which specifies an unindent, that is, when CNTINC is zero. The second case occurs when the last .IN h control in the sequence has h less than the current temporary left margin, that is, when CNTINC is less than, abbreviated "LT", CURINC.

The latter case is a necessary preliminary step in transforming a DCF control that moves the temporary left margin to the left but does not move the temporary left margin all the way back to the permanent left margin. The preliminary RCR moves it all the way back and then one or more Indent Tabs move it to the desired position. To put it another way, L3 has no Unindent Tab control so the sequence RCR ITs is used instead. Note that the first case is a subset of the second case. Therefore the condition CNTINC LT CURINC implies a need to unindent for either case.

However, in L3, and RCR is not the only control item that unindents. The others are: IRT, which is equivalent to RCR and which DOWN never writes; RPE, which DOWN writes in response to a .PA control; LFC, which DOWN sometimes writes in response to .FO, .JU, .SS, .DS, or .TB; RMLF, APM, AAM, RTMF, which DOWN never writes because that would require complex pattern recognition; and TUFC, which DOWN writes in response to handle .FO, .JU, .SS, .DS, or .TB.

When a sequence of DCF controls contains controls that transform into output items that unindent, DOWN refrains from writing an RCR. This is particularly necessary in the case where a sequence contains an .IN 0 and a .PA. If DOWN wrote both an RCR and an RPE, it would incorrectly leave an extra blank line. Neither DCF control ever creates a blank line. Either of the corresponding L3 controls does create a blank line if it occurs after a line ending control. Therefore, even one of the L3 controls must override the initial CRE. Writing all three of CRE, RCR, and RPE would leave two incorrect blank lines.

Similarly, DOWN does not write an RCR when it is transforming a sequence of DCF controls that requires generation of either a LFC or a TUFC. In these cases, writing a RCR, instead of the single CRE at the start, would be merely redundant, not incorrect. The one viable rule in the decision table for RCR, see FIG. 10, says that DOWN writes an RCR if a sequence of DCF controls says to move the temporary left margin to the left and does not say to do any other things that happen to unindent.

CREs means one or more Carrier REturn single-byte controls used to transform the .SK v control in DCF into blank lines in L3. The decision table for this DCF input item is given in FIG. 11. The number of CREs is CNTBL, which is the total of the parameters (v) in all of the .SK v controls in the sequence that has just ended. If CNTBL is zero, the number of CRE controls to be written out is zero and the above decision table is not satisfied. That is the meaning of "Y" in the row containing the name of a state variable. Note that just a .SK 0 control leaves no blank lines, but does cause a break. Moreover, if it follows a .PA NOSTART control, a .SK 0 control does start a new page. This is because of other bits that are set when .SK is encountered in a sequence. The CNTBL variable must be reset to zero by the end of processing the sequence of controls.

Note that having a .PE in the sequence requires an RPE which overrides writing out the single CRE. For example, the DCF sequence

TEXT1 EOR

.SK 3 EOR

.PA EOR

TEXT 2 transforms into L3 as

TEXT 1 CRE CRE CRE RPE TEXT 2, where all three CREs come from the .SK 3. The first CRE merely ends the line consisting of TEXT1. The next two CREs leave blank lines. The RPE leaves the third blank line. Note that DOWN ignores null DCF records, that is, successive EORs. DOWN does not detect a null record and increment the count of blank lines.

The decision table for (RSP CRE)s is depicted in FIG. 12. (RSP CRE)s means one or more pairs of Required Space and Carrier Return used to transform .SP v controls into required blank lines that can not be deleted at the top or bottom of a page. Contrast this with the "conditional" blank lines specified by the .SK v control. The number of RSP CRE pairs is CNTRBL, which is the total of the the parameters (v) in all of the .SP v controls in the sequence that has just ended. If this is zero, no pairs are written, but the other functions of .SP 0 are performed as described for CREs. The CNTRBL transient state variable must be reset to zero by the end of processing of the sequence of DCF controls to L3.

(CRE RSP)s means the same sort of pairs of controls as the previous output, but in the opposite order. The decision table for these DCF input items is depicted in FIG. 13. As we have seen, there are situations where the first single CRE is not written because a .PA in the DCF sequence requires writing a RPE into the L3 data stream. In such a situation, it is wrong to write CNTRBL pairs of RSP and CRE. The first RSP would go at the end of a text line rather than at the start of a blank line. For example, the DCF sequence

TEXT1 EOR
.SP 3 EOR
TEXT2 would transform into L3 as

TEXT1 RSP CRE RSPCRE RSP CRE RPE
TEXT2 which misses a blank line and extends a text line.

Yet it would also be wrong to put the RPE before the RSP, because that would put the blank lines on the following page. Therefore, it is necessary to test whether either (or both) of GOTPA or GOTPAN is set to one and, if so, to write the first CRE before the first RSP. That is, in this case, DOWN writes CRE RSP pairs instead of RSP CRE pairs. The number of pairs is CNTRBL, as for the previous output, only the order differs. Note that the RPE after an RSP leaves the last required blank.

DOWN writes an End Underscore multi-byte control into the L3 data stream as part of the transformation of a DCF sequence that contains a .US OFF control. The decision table for this particular L3 output item is illustrated in FIG. 14.

DOWN writes a Required Page End or RPE single-byte control as part of the transformation to L3 of any DCF sequence that contains a .PA control. See FIG. 15 for the RPE decision table. Depending on whether this control does not contain the NOBREAK parameter, its presence can be signified by either GOTPA or GOTPAN. It is never necessary to write more than one RPE single-byte control when transforming a sequence of DCF controls to L3. A second .PA control always starts a new sequence.

The Line Format Change sequence of multi-byte controls, namely the multi-byte controls BLFC, SLP, STAB, and ELFC, is written into the L3 data stream as part of the transformation of a sequence of DCF controls that contains any of the controls that can transform into either a LFC or a TUFC, namely

.FO
.JU
.TB
.SS
.DS but does not contain any of the DCF controls that can transform only into a TUFC, namely

.RH
.RF
.CM DRAWER

This is because a TUFC can contain any information that a LFC can contain, so it is never necessary to write both an LFC and a TUFC. See the decision table for LFC shown in FIG. 16.

Most of the output L3 items are very easy for DOWN to write once a decision table has told DOWN whether or not to write them. A LFC is not so easy. It has parameters that depend on information gleaned from DCF controls in the sequence that just ended or unchanged information held over from the previous state. In particular, it must use information in VALADJ, VALAL, VALTP and VALSSDS. Moreover, DOWN must set the new values into the corresponding persistent state variables CURADJ, CURAL, CURTP, and CURSSDS.

DOWN writes a Zero Index Carrier Return single-byte control for two purposes. First, rule 1, after a CRE, a ZICR ends a paragraph without unindenting. This pair is the transformation of DCF's BREAK. Second, rules 2, 3 and 4, after a LFC, a ZICR insures that the changes specified by the LFC take effect immediately. For each purpose, the ZICR is written after a line ending control. Therefore, it does not move the current position at all. Its function is one of convention, not one of motion, when it follows a line ender. The ZICR decision table is illustrated in FIG. 17.

The first purpose for which ZICR is written by DOWN does not apply to all sequences that include a BREAK, that is, either a .BR control of any of the other 51 controls that cause a BREAK in the concatenation of lines. The L3 concept "end of paragraph" corresponds to the DCF concept of BREAK. A sequence of DCF controls can contain other controls that transform into L3 items that end a paragraph. The L3 items that end a paragraph, and the DCF controls that DOWN transforms into these L3 items, are summarized in the table shown in FIG. 18.

DOWN need not write a ZICR to end a paragraph, when DOWN is transforming a sequence of DCF controls that includes any control on the right side of FIG. 18, because the corresponding L3 item itself will end the paragraph. Each supported DCF control that causes a break is in the above table except for .BR itself. Hence, the first purpose of ZICR applies only to transformation of .BR and of unsupported controls that cause a break.

Note that any of about 8 single-byte controls in L3 ends a paragraph if, and only if, it follows a CRE or a PE. DOWN makes no attempt to look ahead of a sequence of DCF controls to see if the next line starts with one of these single byte controls, such as SP, RSP, BS, or even IT. As a result, DOWN occasionally writes a ZICR that is not strictly necessary. The extra ZICR does no harm and it insures that a break continues to take effect even if subsequent editing removes the subsequent single-byte control that made ZICR unnecessary.

Note that CRE and ZICR interact with each other and with other input items that DOWN may have to write into the L3 data stream, in a fairly complex way, relative to ending a paragraph. See rule 2 for CRE and rule 1 for ZICR. Rule 2 for CRE says that either of GOTPA, which signifies that a .PA control is present in the sequence and will transform to a RPE, or CNTINC LT CURINC, which signifies need for a RCR to move the temporary left margin to the left) overrides writing out a CRE even though a paragraph end is required. Rule 1 for ZICR says that these two things, and many more as well, inhibit writing out a ZICR.

DOWN can have three purposes for writing a PAGE END single-byte control, see FIG. 19 for the decision table. First, rule 1, a sequence of DCF controls may contain a PE byte put there by UP to preserve pagination when an L3 document was transformed to DCF. Second, rules 2, 3 and 4, a sequence may contain one of the DCF controls that transforms into a TUFC which, in turn, must follow a PE and a TUP. Third, rule 5, a sequence may contain an EOF which transforms into an End Unit which, in turn, must follow a PE.

It should be noted that these five rules are not mutually exclusive. In fact, the five controls, including the PE byte and the EOF, can occur in any combination. A decision table containing only disjoint rules would need 31 of them.

A given sequence can contain both margin text definition and an EOF. An early draft of a DCF document can end with margin text intended to apply to text that is to be added later. Such text may be added after the DCF document is transformed DOWN to L3.

A Text Unit Prefix (TUP) first level vector is necessary if the sequence of DCF controls requires ending the previous Text Unit and also requires starting another Text Unit. See FIG. 20 for the TUP decision table. Rule 1 considers the presence of a PE byte in the sequence to require DOWN to end the previous Text Unit. However, it requires DOWN to also start a new Text Unit only if the sequence contained no End Of File. Rules 2, 3, and 4 work in the following manner. The presence of a DCF sequence of any DCF Control which requires a TUFC, in turn, requires DOWN to end the previous Text Unit and also to start a new Text Unit. This is independent of whether the sequence contained an EOF or not. An EOF means there is no more real body text, but another Text Unit is necessary to contain the TUFC and perhaps the MP and MT. The DCF controls that require a TUFC, and hence require a new Text Unit, whether or not the sequence contained an EOF, are any of .CM DRAWER, which itself transforms into a TUFC, and .RH and .RF, which transform to MP and MT which, in turn, must follow a TUFC.

Rules 5, 6, and 7 cover a unique situation that can occur in the last sequence of a document, that is, in the sequence that contains the document's End Of file. This unique situation involves the fact that some DCF controls transform to L3 controls that are written before a PE is written while other DCF controls transform to L3 controls that are written after a PE is written. When an EOF and any of the latter type of controls both appear in the same sequence of controls, we write a PE and then write other L3 controls that must follow the last PE. Hence, in this unique situation, we must prepare to write another PE at a later time. The DCF controls that can cause this unique situation to arise are .IN, .US ON and .CE. The .HW control would also be included in this grouping if it caused anything to be written into the L3 data stream before any text is written, but it does not. The problem comes up because an EOF in a sequence requires writing a PE. However, writing a PE ends the current Body Text vector and Text Unit. This leaves no Body Text vector for DOWN to place the transforms of .IN, .US ON, and .CE into. These transforms are ITs, BUS, and SPs ATF, respectively. It would be very difficult to move these controls ahead of PE in the output ordering, just for the unique situation where the DCF controls that require them appear in the last sequence. Therefore, the unique situation is handled by starting a new Text Unit, with a TUP, to hold any necessary ITs, BUS, or SPs ATF.

This treatment of the unique situation corresponds to the treatment of .RH, .RF, or .CM DRAWER, in the last sequence. Either starts a new Text Unit to hold the transforms of a few controls that can not go in the last Text Unit that actually contains text. A document that makes full use of this treatment has its last sequence as follows.

```
TEXT
.CM DRAWER '''
.RH ON ''' .RH OFF
.RF ON ''' .RF OFF
.IN 5
.CE
EOF
```

Such a document must be viewed as slightly irregular, but certainly not impossible. Such controls at the end of a DCF document, that is then transformed DOWN to L3, imply intent to add more text using Displaywriter. DOWN begins a new Text Unit to hold the L3 items and future added text.

It is undesirable to begin a new Text Unit just to hold some IT controls that reestablish an indent level that happened to exist at the end of the document and happened to get reset back to the permanent left margin by something in the last sequence of controls. Rule 6 is written to exclude this case. To satisfy Rule 6, the ITs must be required by an explicit .IN h control in the last sequence, so GOTIN must be true, and the value of h in that control must be nonzero, so CNTINC GT ZERO must be true.

Note that this treatment begins a Text Unit especially to allow DOWN to transform six controls that occur in the same sequence as an EOF. Later, after DOWN writes out the L3 items corresponding to one or more of these controls, DOWN will be required to write a special PE to end that Text Unit. This is the explanation for the "Special PE" decision table, given here so that the rather elaborate context need not be established twice.

DOWN writes a Text Unit Format Change (TUFC) in response to one or more of the .RH, .RF, or .CM DRAWER controls in a DCF sequence. The latter actually puts new information into the TUFC's parameters that specify a printer's source drawer. The .RH and .RF controls define margin text that can be transformed to L3 only after a TUFC. Fortunately, the TUFC's other parameters can contain new information specified by other DCF controls, if there are any in the same sequence.

Like LFC, TUFC is nontrivial to write, even after a decision table, see FIG. 21, has told DOWN whether or not to write it. TUFC has parameters that depend on information gleaned from DCF controls in the sequence that just ended or unchanged information held over from the previous state. In particularly, it must use information in VALADJ, VALAL, VALTP, VALSSDS and VALCMDR. In addition, DOWN must set the new values into the corresponding persistent state variables CURADJ, CURAL, CURTP, CURSSDS, and CURCMDR.

DOWN writes the Margin Text Parameters and Margin Text first level structures as part of the transformations of a DCF sequence that contains, perhaps among other things, the following.

.RH ON
Text and almost any controls
.RH OFF

Processing of top margin text at the end of a sequence of DCF controls is simple because the MP and MT vectors were prepared in response to the .RH ON etc, while the DCF sequence was being read. They are in the buffer named Top Margin Text (TMT). The GOTRHON state bit is one if and only if there is something in TMT that needs to be written out into the L3 data stream at this point. The MP and MT decision table is shown in FIG. 22.

The Bottom Margin Parameters and Bottom Margin Text are similar to the definition of Top MP and Top MT. See the decision table set forth in FIG. 23. DOWN writes the definition into buffer BMT in response to DCF input

.RF ON

Text and almost any controls

.RF OFF while DOWN is reading a sequence of controls. DOWN writes the buffer into the L3 data stream when DOWN is transforming an ended sequence of DCF controls to L3.

DOWN writes a new Body Text (BT) vector's header at this point in the transformation of a sequence of DCF controls to L3 if, and only if, DOWN previously wrote a Text Unit Prefix. Each Text Unit begins with a TUP and ends with a BT. Therefore, the decision tables for these two L3 times are identified. FIG. 24 shows the details thereof. Note that the BT vector is begun, but not ended here. In general, DOWN transforms text interspersed with many sequences of DCF controls into L3 and writes L3 into this Body Text vector. DOWN only ends the BT vector when something transforms to a Page End single-byte control.

Thirty-three SPace characters and an Align Text Field multi-byte control are the transformation of the .CE control from DCF to L3. The SPs always follow a paragraph ender. This is because the .CE control causes a BREAK, so any sequence of DCF controls that contains a .CE control transforms to L3 that includes at least CRE ZICR and perhaps something even stronger, such as an RCR or an RPE. This transformation is revealed in the decision table of FIG. 25.

DOWN writes Indent Tab controls (ITs) to establish or reestablish a desired temporary left margin for future lines and to have the effect of Horizontal Tab characters in the current line. If the current line has not yet begun, these effective HT characters give the current line the same effective temporary left margin as future lines, otherwise they give a hanging indent.

Two item occurrences in a sequence of DCF controls require DOWN to write ITs into the L3 that is the transform of that sequence of DCF controls. First, an indent control, .IN h, can specify a new temporary left margin. Second, some other control in the DCF sequence can require DOWN to restore a pre-existing temporary left margin.

The first use of IT moves the temporary left margin either from its old position to its newly specified position or from the permanent left margin to the specified new position. Thus, this first use of ITs has two subcases. In the first subcase, the new temporary left margin is to the right of the permanent left margin and no other control in the same sequence transforms to an L3 item that resets the temporary left margin back to the permanent left margin. In this subcase, DOWN writes only enough ITs to move the temporary left margin from its old position to its new position.

In the second subcase of the first use, either the new temporary left margin is to the left of the old temporary left margin, which can be transformed to L3 only by resetting the temporary left margin back to the permanent left margin and using ITs to move to the right from there, or else some other DCF control in the sequence transforms to an L3 item that happens to reset the temporary left margin back to the permanent left margin, which again requires enough ITs to move from the permanent left margin to the specified new temporary left margin. The second major use of ITs is to reestablish a temporary left margin that existed before the current sequence of DCF controls began and that is not changed by anything in the current sequence of controls. For example, a sequence that contains only the control .FO OFF does not change the temporary left margin. However, the .FO OFF control must transform into a Line Format change (LFC) sequence of multi-byte controls in L3. A LFC resets the temporary left margin back to the permanent left margin. Thus, the sequence consisting of just .FO OFF must transform into an LFC followed by zero or more ITs to reestablish whatever temporary left margin is in effect.

This second major use of ITs is more interesting when a sequence of DCF controls includes a .TF control, which changes the tab settings. A .TB control transforms into either a LFC or a TUFC. Either a LFC or a TUFC resets the temporary left margin, so it requires DOWN to reestablish the temporary left margin or to establish a specified new temporary left margin, in the first use. However, the number of ITs required to reestablish, or establish, the temporary left margin depends on the settings in the new tab rack. It is not necessary to know how many ITs were in effect before the tab rack changed. It is sufficient to know the character position of the desired temporary left margin, whether or not that has changed.

Whether DOWN must write ITs, and the number of ITs it must write, depend on the following information:

the tab settings that will be in effect after transformation of the current sequence is complete (VALTP), the character position of the temporary left margin desired after transformation of the current sequence is complete, whether or not the current sequence changes that value (CNTINC), the character position of the temporary left margin before the current sequence of DCF controls began (CURINC), and whether or not any L3 item, written out as part of the transformation of this sequence of DCF controls, resets the temporary left margin back to the permanent left margin.

The L3 items that reset the temporary left margin, and the DCF controls that transform into those L3 items are compared in the table illustrated in FIG. 27. The first item in the table requires a comment. It is not important whether any .IN h control had h less than CURINC. What is important is whether the last .IN h control in the sequence had h less than CURINC. Therefore, the condition that DOWN tests is CNTINC LT CURINC.

Rule 1 of the FIG. 26 table dictates that if the sequence that just ended contains none of these controls, and no EOF, then DOWN writes one or more ITs if, and only if, CNTINC is greater than CURINC. The number of ITs it writes is one more than the number of tab settings whose character positions are strictly greater than CURINC and strictly less than CNTINC.

Rules 2 through 9 hold that if the sequence that just ended contains any one or more of these controls, and does not contain an EOF, then DOWN writes one or more ITs if and only if CNTINC is greater than zero. The number of ITs it writes is one more than the number of tab settings whose character positions are strictly less than CNTINC.

Rules 1 through 9 specify that ITs will not be written if the sequence contains an EOF. There is one case in which DOWN does write ITs in the transformation of the last sequence of DCF controls, i.e., the sequence that includes an EOF. See Rule 6 of the decision table for TUP. Rule 10 for left margin temporary reset is derived from this condition. This is the case where DOWN has begun a new text Unit to hold ITs and/or a few other L3 items that can end an in-process document and that apply to text to be added later. This is the case where there was an actual .IN h control in the last sequence with h greater than zero.

At the end of writing out ITs, DOWN sets the character position of the new temporary left margin into both CNTINC and CURINC. This state is absolutely necessary for correct processing of the next sequence of DCF controls. Note particularly that this can involve increasing the value of CNTINC. The value of CNTINC was the value of h in the last .IN h control that appeared in the sequence of DCF controls that just ended. If this value does not match any tab setting on the current tab rack, then the final value of both CNTINC and CURINC is the character position of the next higher tab setting, i.e., the true temporary left margin's resultant value.

DOWN writes a Begin UnderScore (BUS) multi-byte control as part of the transformation of a sequence of DCF controls if, and only if, that sequence of controls contained .US ON. Its decision table is shown in FIG. 28.

DOWN sets the persistent status bit CURHW, as part of processing the end of a sequence of DCF controls if, and only if, that sequence contained a .HW control. Setting CURHW tells the program to replace any hyphen character in the following word by the L3 single-byte control Syllable HYphen. The .HW control has no more immediate effect on the L3 data stream. The CURHW decision table is depicted in FIG. 29.

A special PE ends a Text Unit and its Body Text vector without having written any real text into it. DOWN has a unique situation, detailed as a part of the TUP decision table's description, when a document's last sequence contains controls intended to apply to text added later. See the special PE decision table in FIG. 30.

TUP's rules 2, 3, and 4 can be satisfied whether or not the sequence contains an EOF. If the sequence does contain an EOF, and one of these rules is satisfied, then DOWN begins a Text Unit, and, thereafter, a Body Text vector, that must be brought to a graceful termination even though no text is ever written into either of them. The same-numbered rules apply here only if the sequence does contain an EOF, because only in this case does DOWN need special action to end the Text Unit and Body Text vector these rules began.

TUP's rules 5, 6, and 7 apply only when the sequence being transformed is the last sequence in a document. Therefore, identical rules with the same numbers appear here to tell DOWN when to end the Text Unit and Body Text vector they began. Rule 1 is left blank here to correspond to the appropriate rules in the output decision tables for TUP and BT.

DOWN writes an End Unit (EU), i.e., an End Unit Prefix, a Body Text vector, and a Page End in that BT vector, as the last part of transforming the last sequence in a DCF document to L3. The last sequence is signified by GOTEOF which means that an End Of File was part of the sequence of DCF controls. The EU decision table is shown in FIG. 31.

Although the present invention has been described in the context of a preferred embodiment thereof, it will be readily apparent to those skilled in the appertaining art, that modifications and variations can be made therein without departing from its spirit and scope. Accordingly, it is not intended that the present invention be limited to the specifics of the foregoing description of the preferred embodiment. Instead, the present invention should be considered as being limited solely by the appended claims, which alone are intended to define its scope.

Having thus described our invention, what we claim as new and desire to secure by Letters Patent, is as follows:

1. A method of transforming a source document, cast in a first editable form which includes a plurality of input items therein, to a target document of a second editable form which includes output items compatible therewith, said method comprising the steps of:
   (a) determining a set of key state variables, from amongst all possible key state variables, that reflect and collectively identify information concerning the presence of source document control items that are read in a sequence thereof from said source document;
   (b) determining criteria for compatibility of source input items to be read with source controls that have been read in a sequence and reflected in said key state variables;
   (c) establishing a fixed order for all possible output items in which any necessary pair of output items in the transformation of a given input sequence will be written in said established order;
   (d) defining a set of rules for each possible output item that determine whether each of said possible output items is to be written out to said target document as a function of the status of said state variables; and
   (e) reading a sequence of input items from said source document in accordance with said compatibility criteria; and
   (f) writing out all eligible output items under said rules as a transform of said sequence in said fixed order of output items.

2. The method according to claim 1 which comprises the additional step of ending a sequence of control items if a text input item is encountered therein.

3. The method according to claim 1 which comprises the additional step of ending a sequence of control items if an incompatible control item is encountered therein.

4. The method according to claim 1 which comprises the additional step of determining the the presence of sub-documents within said source document and thereafter preserving the same for use after transformation has occurred.

5. The method according to claim 1 which comprises the additional step of limiting the number of said key state variables to no more than 18.

6. The method according to claim 1 which comprises the additional step of determining pairs of output items that are mutually exclusive within the transformation of any one given sequence of input items.

7. The method according to claim 1 wherein said step of establishing said fixed order of all possible output items is accomplished by writing a decision table containing hierarchical rules of order for particular pairs of output items and then sorting the rows so that the numbers forming the hierarchy increase from top to bottom of said table.

* * * * *